(12) United States Patent
Nakazawa

(10) Patent No.: US 10,014,601 B1
(45) Date of Patent: Jul. 3, 2018

(54) CONNECTOR

(71) Applicant: Japan Aviation Electronics Industry, Limited, Tokyo (JP)

(72) Inventor: Katsuhiko Nakazawa, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 15/800,271

(22) Filed: Nov. 1, 2017

(30) Foreign Application Priority Data

Jan. 4, 2017 (JP) ................. 2017-000154

(51) Int. Cl.
*H01R 9/22* (2006.01)
*H01R 11/12* (2006.01)

(52) U.S. Cl.
CPC ............. *H01R 9/226* (2013.01); *H01R 9/223* (2013.01); *H01R 11/12* (2013.01)

(58) Field of Classification Search
CPC .. H01R 9/2408; H01R 13/518; H01R 13/514; H01R 23/025
USPC ................. 439/701, 540.1, 717, 676, 610
See application file for complete search history.

(56) References Cited

U.S. PATENT DOCUMENTS

| | | | | |
|---|---|---|---|---|
| 8,888,538 B2* | 11/2014 | Regnier | ............... | H01R 12/724 439/540.1 |
| 8,894,438 B2* | 11/2014 | Schmitt | ............... | H01R 13/659 439/540.1 |
| 8,939,798 B2* | 1/2015 | Oberski | ............... | H01R 24/64 439/540.1 |
| 9,124,041 B2 | 9/2015 | Ebisawa | | |
| 9,172,168 B2 | 10/2015 | Ebisawa et al. | | |
| 9,570,722 B2 | 2/2017 | Ebisawa et al. | | |
| 2011/0021058 A1* | 1/2011 | Todo | ................ | H01R 13/62911 439/345 |
| 2014/0342213 A1 | 11/2014 | Ebisawa et al. | | |

FOREIGN PATENT DOCUMENTS

| | | |
|---|---|---|
| JP | 2013-008612 A | 1/2013 |
| JP | 2013-025938 A | 2/2013 |
| JP | 2013-140709 A | 7/2013 |
| JP | 5247896 B2 | 7/2013 |

* cited by examiner

*Primary Examiner* — Phuong Chi T Nguyen
(74) *Attorney, Agent, or Firm* — Collard & Roe, P.C.

(57) ABSTRACT

A connector comprises a first receiving portion formed with a first opening, a second receiving portion formed with a second opening, a first contact portion located inside the first receiving portion and a second contact portion located inside the second receiving portion. The first opening is visible both when the connector is seen along a first orientation and when the connector is seen along a third orientation perpendicular to the first orientation. The second opening is visible both when the connector is seen along a second orientation opposite to the first orientation and when the connector is seen along the third orientation. The first contact portion is in contact with a first busbar which is received in the first receiving portion through the first opening. The second contact portion is in contact with a second busbar which is received in the second receiving portion through the second opening.

14 Claims, 30 Drawing Sheets

CONNECTOR

CROSS REFERENCE TO RELATED APPLICATIONS

This application is based on and claims priority under 35 U.S.C. § 119 to Japanese Patent Application No. JP 2017-000154 filed Jan. 4, 2017, the content of which is incorporated herein in its entirety by reference.

BACKGROUND OF THE INVENTION

This invention relates to a connector which is connectable with another connector via a busbar.

For example, this type of connector is disclosed in JP 5247896B (Patent Document 1), the content of which is incorporated herein by reference.

Referring to FIG. 58, Patent Document 1 discloses a power storage device which comprises a plurality of battery units (not shown), a plurality of connectors 90 corresponding to the battery units, respectively, and a plurality of connection members (busbars) 96. The battery units are accommodated in a storing rack, which is not shown except a panel 992, and arranged in an upper-lower direction. Each of the connectors 90 comprises a housing 92 and two contacts (not shown) arranged left to right. The housings 92 are attached to the panel 992 and arranged in the upper-lower direction. In each of the connectors 90, the contacts are connected to a positive electrode and a negative electrode of the corresponding battery unit, respectively (not shown).

Each of the busbars 96 has a flat-plate portion 962 and two ends 964 and 966. Each of the housings 92 is formed with two insertion holes 924 and 926 which correspond to the contacts (not shown), respectively. Each of the busbars 96 connects two of the connectors 90, which are vertically adjacent to each other, with each other. In detail, the end 964 of the busbar 96 is inserted in the insertion hole 924 of the lower connector 90 and is connected to the left contact, and the end 966 of the busbar 96 is inserted in the insertion hole 926 of the upper connector 90 and is connected to the right contact. The aforementioned connection with use of the busbars 96 connects the plurality of the battery units (not shown) with one another via the plurality of the connectors 90.

The flat-plate portion 962 of the busbar 96 of Patent Document 1 has a crank shape. In addition, each of the ends 964 and 966 of the busbar 96 is bent. The busbar 96 has a complicated shape as described above so that manufacturing cost increases. Moreover, in order to connect two of the connectors 90 with each other, the busbar 96 needs to be formed in a shape and a size corresponding to the arrangement of these two connectors 90. In other words, the busbar 96 of a complicated shape is unsuitable for general use.

SUMMARY OF THE INVENTION

It is therefore an object of the present invention to provide a connector which is connectable with another connector via a busbar of a simple shape.

An aspect of the present invention provides a connector connectable to two busbars of a first busbar and a second busbar. The connector comprises a housing and two contacts of a first contact and a second contact. The housing is formed with a first opening, a first receiving portion, a second opening and a second receiving portion. The first opening is visible when the housing is seen along a first orientation in a predetermined direction and is visible when the housing is seen along a third orientation in a perpendicular direction perpendicular to the predetermined direction. The second opening is visible when the housing is seen along a second orientation opposite to the first orientation and is visible when the housing is seen along the third orientation. The first receiving portion partially receives the first busbar when the first busbar is inserted through the first opening. The second receiving portion partially receives the second busbar when the second busbar is inserted through the second opening. Each of the contacts is held by the housing and has a contact portion. The contact portion of the first contact is located inside the first receiving portion and is brought into contact with the first busbar when the first busbar is partially received in the first receiving portion. The contact portion of the second contact is located inside the second receiving portion and is brought into contact with the second busbar when the second busbar is partially received in the second receiving portion.

According to an aspect of the present invention, the first opening is visible both when the housing is seen along the first orientation and when the housing is seen along the third orientation perpendicular to the first orientation. In addition, the second opening is visible both when the housing is seen along the second orientation opposite to the first orientation and when the housing is seen along the third orientation. Each of the thus-formed first and second openings allows the insertion of the busbar along the third orientation. Under a state where first and second connectors according to an aspect of the present invention are arranged so that the first opening of the first connector faces the second opening of the second connector in the predetermined direction, only by moving the busbar of a simple rectangular shape along the third orientation, one of ends of the busbar is inserted into the first opening to be connected with the first connector, and a remaining one of the ends of the busbar is inserted into the second opening to be connected with the second connector. Thus, the connector according to an aspect of the present invention is connectable with the other connector via the busbar of a simple shape.

An appreciation of the objectives of the present invention and a more complete understanding of its structure may be had by studying the following description of the preferred embodiment and by referring to the accompanying drawings.

Figure 1:
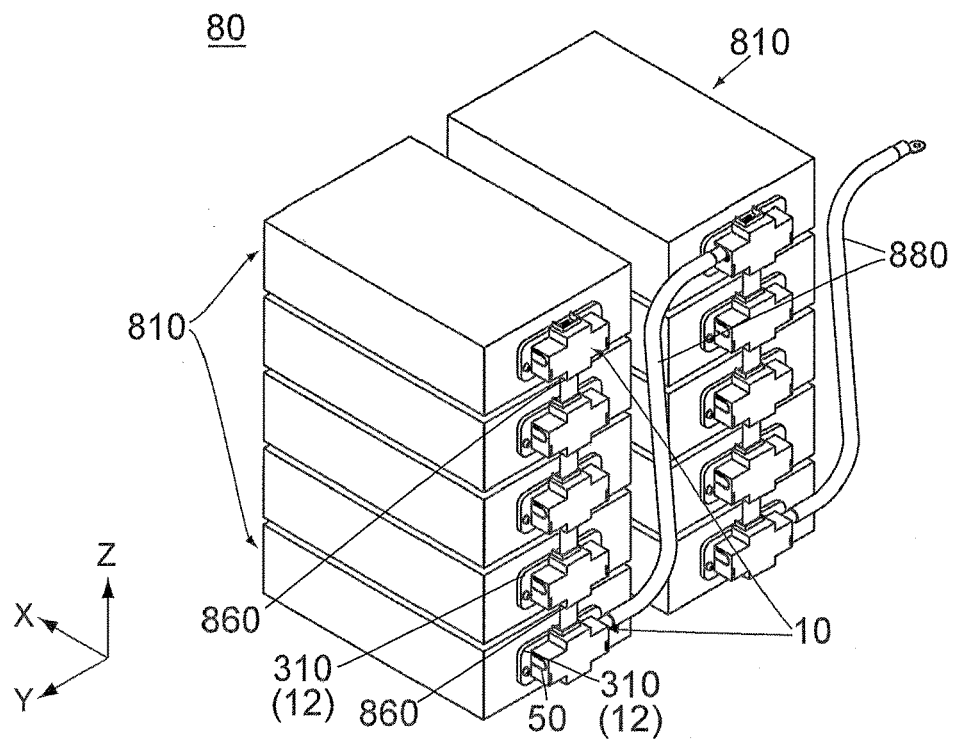
FIG. 1 is a perspective view showing a power storage device which comprises connectors according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

In the following explanation, a rectangular coordinate system is used to indicate positions and directions, wherein this rectangular coordinate system consists of three axes, namely the X-axis, the Y-axis and the Z-axis, perpendicular to one another. Moreover, the word "orientation" is used, instead of "direction", to indicate each of a positively oriented direction and a negatively oriented direction in an axis, for example, the positive X-direction and the negative X-direction in the X-axis. On the other hand, the word "direction" is used to indicate an unoriented direction such as the X-direction.

First Embodiment

Referring to FIG. 1, a connector 10 according to a first embodiment of the present invention is used in a power storage device 80. The power storage device 80 of the present embodiment comprises a plurality of battery units 810 arranged in two rows in a left-right direction (Y-direction). The battery units 810 in each row are arranged in an upper-lower direction (Z-direction). The power storage device 80 is accommodated in a storing rack (not shown). In detail, the storing rack is provided with a plurality of shelves (not shown) corresponding to the battery units 810, respectively. Each of the battery units 810 is placed on the corresponding shelf.

Figure 2:
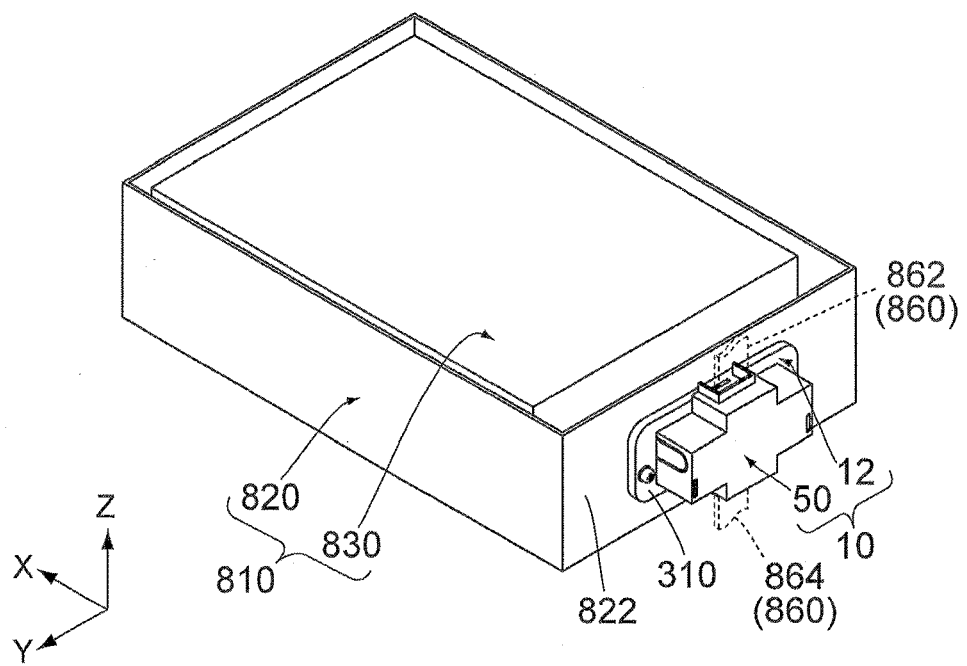
FIG. 2 is a perspective view showing a battery unit of the power storage device of FIG. 1, wherein the connector is attached to the battery unit, outlines of busbars connected to the connector are illustrated in dashed line, and a top plate of a case of the battery unit is not illustrated.

Referring to FIGS. 1 and 2, each of the battery units 810 comprises a battery module 830. The connectors 10 are connected to the battery modules 830, respectively. The connectors 10 connect a plurality of the battery modules 830 with one another via busbars 860 and cables (connection members) 880 so that the power storage device 80 is formed. As described above, the connector 10 of the present embodiment is uses to connect the battery modules 830 with each other. However, the present invention is not limited thereto, but the connector 10 can be used for connection of various devices.

In the present embodiment, each of the busbars 860 connects adjacent two of the connectors 10 in the Z-direction with each other. When the busbar 860 is connected to or disconnected from the connector 10, the busbar 860 is moved in the Y-direction to be inserted into or removed from the connector 10.

In the present embodiment, the Z-direction is the connection direction along which two of the connectors 10 are connected with each other via the busbar 860. This Z-direction is referred to as "predetermined direction". The negative Z-direction in the predetermined direction is referred to as "first orientation", and the positive Z-direction in the predetermined direction is referred to as "second orientation". Moreover, the Y-direction is the insertion and removal direction along which the busbar 860 is inserted and removed. This Y-direction is referred to as "perpendicular direction". The negative Y-direction in the perpendicular direction is referred to as "third orientation", and the positive Y-direction in the perpendicular direction is referred to as "fourth orientation". Moreover, the X-direction that is perpendicular to both the predetermined direction and the perpendicular direction is referred to as "second perpendicular direction". The negative X-direction in the second perpendicular direction is referred to as "fifth orientation", and the positive X-direction in the second perpendicular direction is referred to as "sixth orientation".

Figure 4:
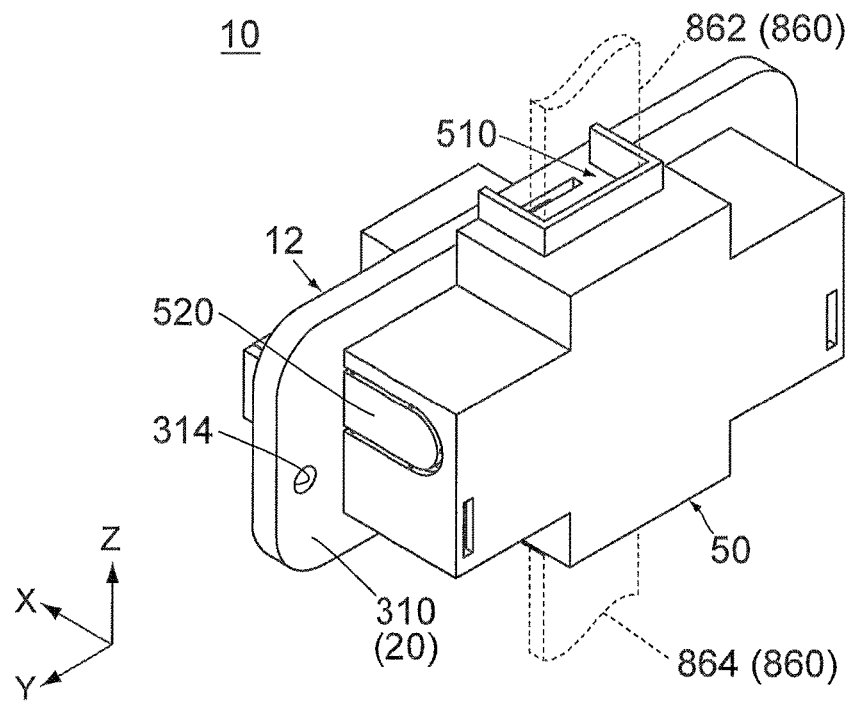
FIG. 4 is a perspective view showing the connector of FIG. 2, wherein outlines of the busbars connected to the connector are illustrated in dashed line.
Figure 5:
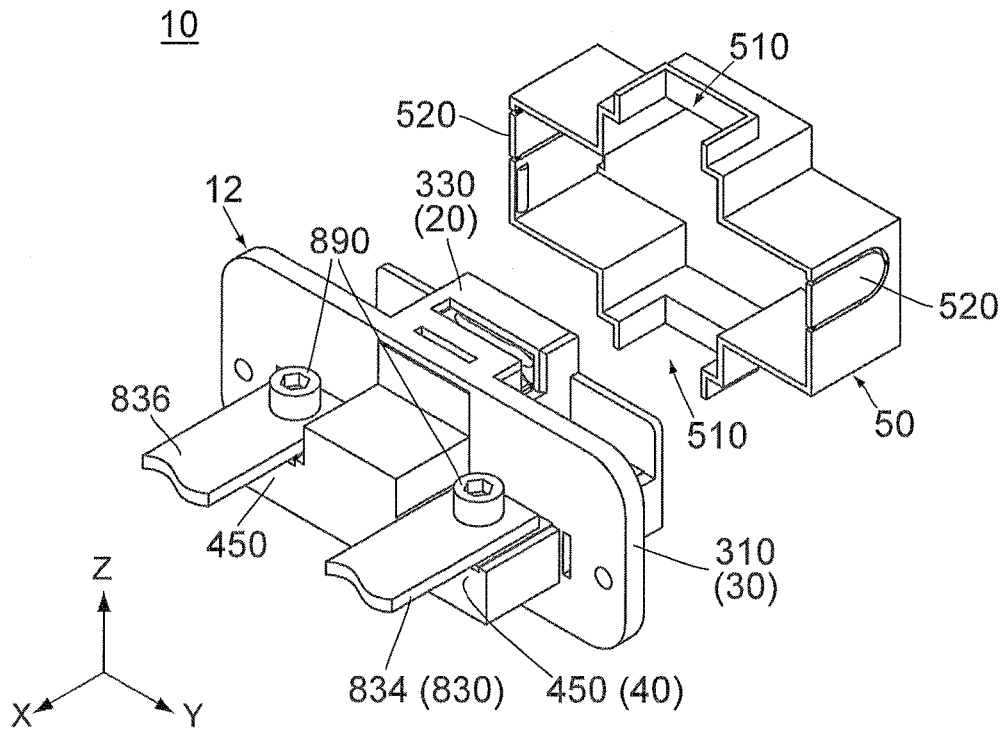
FIG. 5 is a perspective view showing a connector body and a cover of the connector of FIG. 4, wherein terminals of the battery unit are connected to the connector body.
Figure 6:
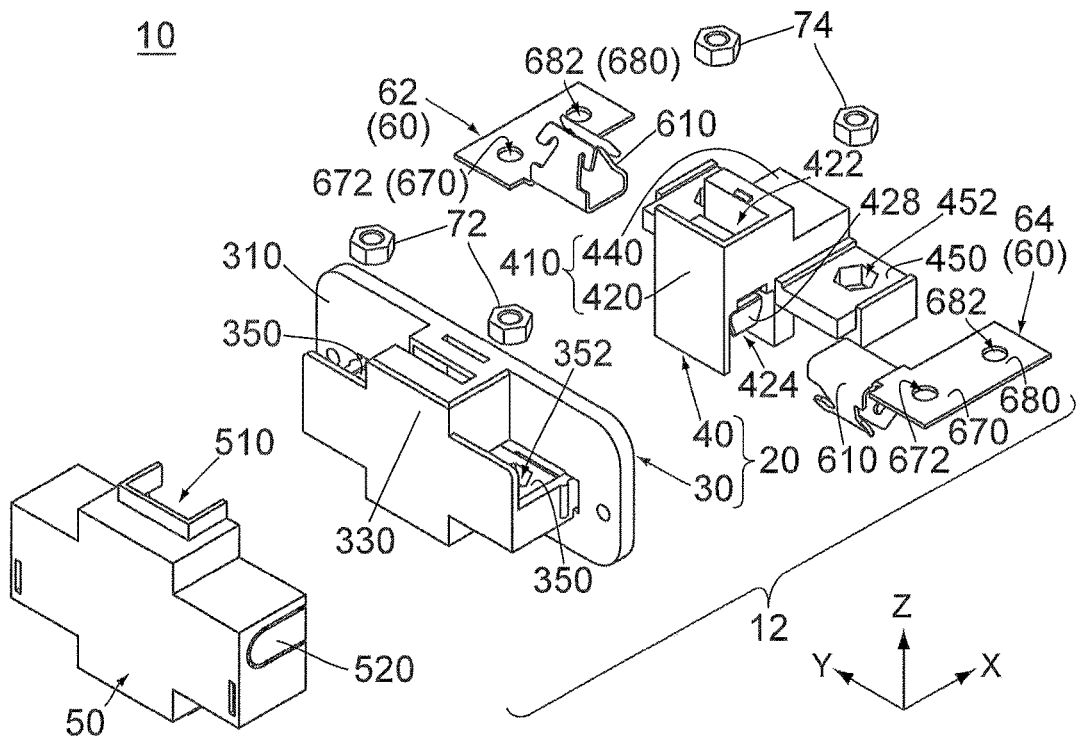
FIG. 6 is an exploded, perspective view showing the connector of FIG. 4.

Referring to FIGS. 4 to 6, the connector 10 of the present embodiment comprises a connector body 12 and a cover 50 made of insulator. Referring to FIG. 6, the connector body 12 comprises a housing 20 made of insulator, two contacts 60 each made of metal, namely a first contact 62 and a second contact 64, two nuts 72 each made of metal and two additional nuts 74 each made of metal. In the present embodiment, the housing 20 comprises a first member 30 and a second member 40. Moreover, the nut 72 and the additional nut 74 have identical shapes and sizes. However, the present invention is not limited thereto. For example, the housing 20 may be a single member or otherwise may comprise three or more members. The nut 72 and the additional nut 74 may have different shapes and sizes. Moreover, the connector 10 may consist of the connector body 12.

Hereafter, explanation is made about a structure of each member of the connector 10.

As shown in FIGS. 6, 7, 9, 12 and 19, the first member 30 of the housing 20 has an attached portion 310, a busbar connection portion 330 and two holding portions 350. The attached portion 310 has a flat-plate shape and extends along a predetermined plane (YZ-plane) defined by the predetermined direction (Z-direction) and the perpendicular direction (Y-direction). The busbar connection portion 330 and the holding portions 350 project from the attached portion 310 along the fifth orientation (negative X-direction). The busbar connection portion 330 is located at the middle of the attached portion 310 in the perpendicular direction and extends between opposite ends of the attached portion 310 in the predetermined direction. The holding portions 350 are located at opposite sides of the busbar connection portion 330 in the perpendicular direction, respectively.

Figure 7:
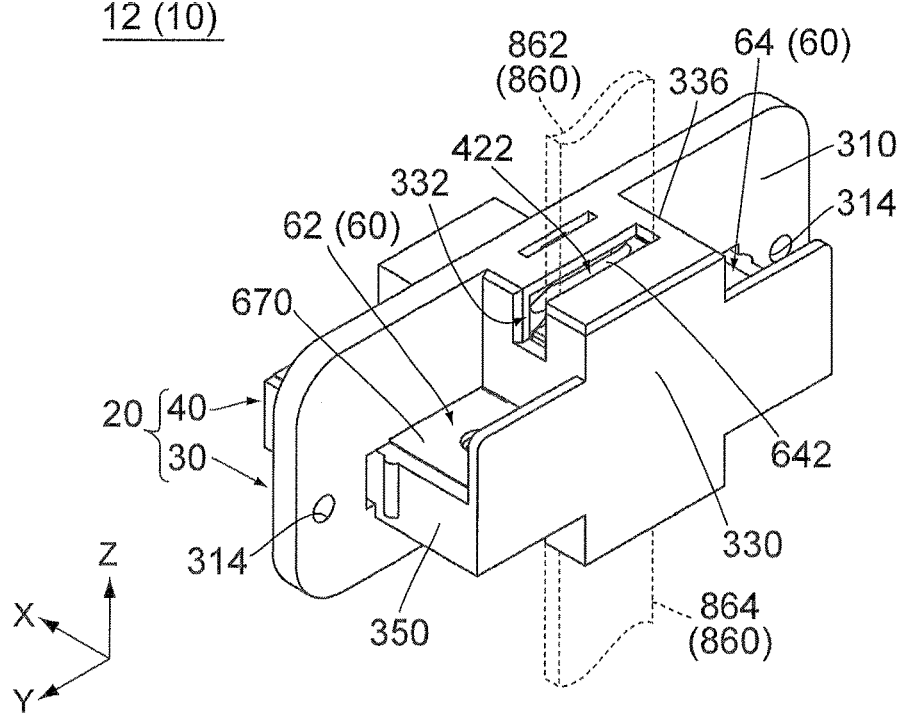
FIG. 7 is a perspective view showing the connector body of FIG. 5, wherein outlines of the busbars connected to the connector body are illustrated in dashed line.
Figure 8:
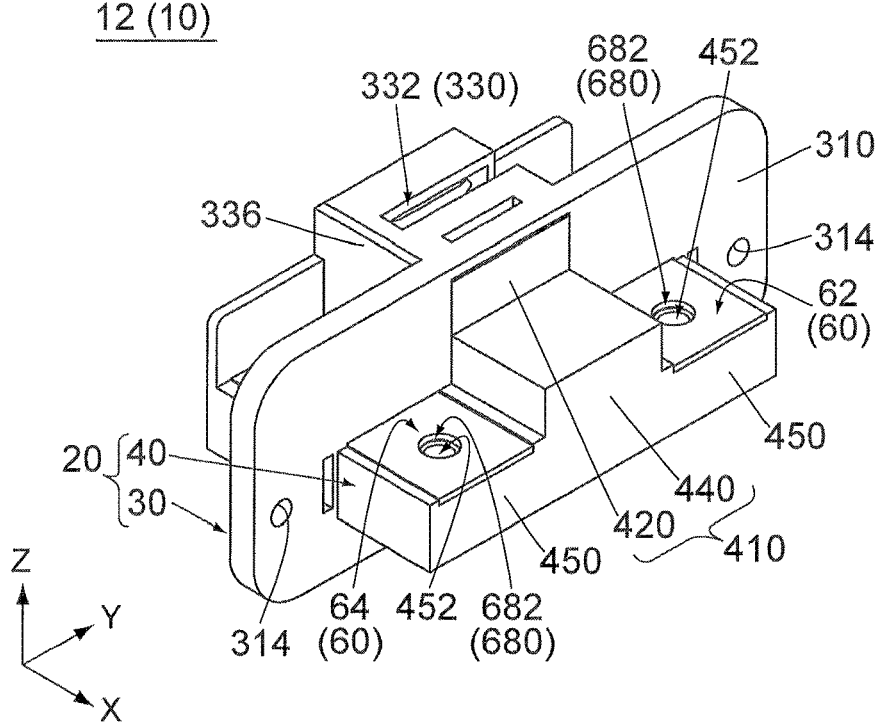
FIG. 8 is another perspective view showing the connector body of FIG. 7.
Figure 19:
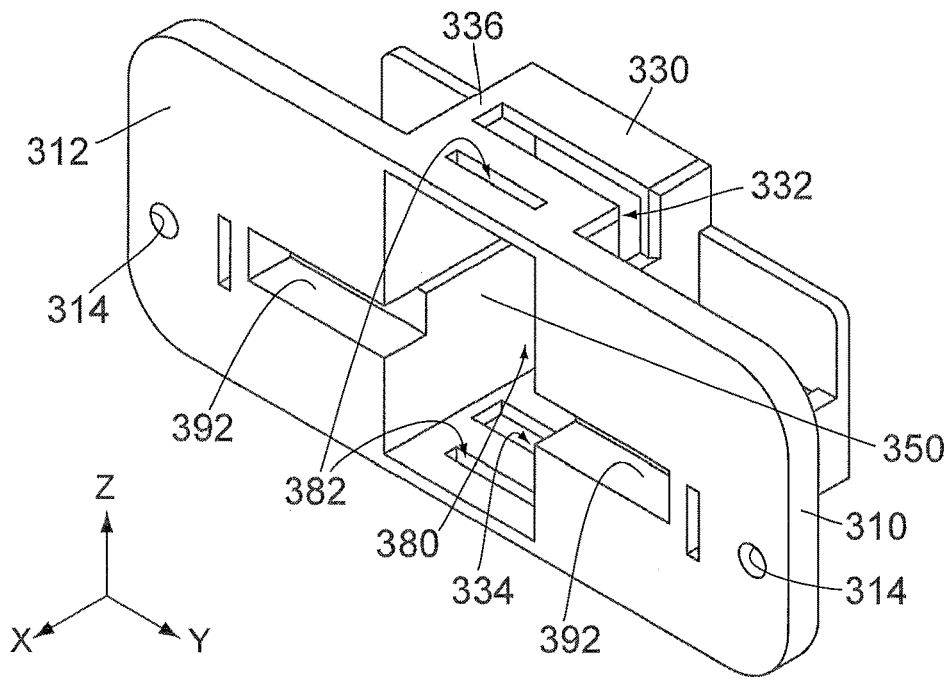
FIG. 19 is a perspective view showing a first member of a housing of the connector body of FIG. 7.

As shown in FIG. 19, the attached portion 310 has an attached surface 312. The attached surface 312 is located in the predetermined plane (YZ-plane). Referring to FIGS. 7, 8 and 19, the attached portion 310 is formed with two attachment holes 314. The attachment holes 314 are located at opposite end portions of the attached portion 310 in the perpendicular direction (Y-direction), respectively. Each of the attachment holes 314 passes through the attached portion 310 in the second perpendicular direction (X-direction).

Figure 17:
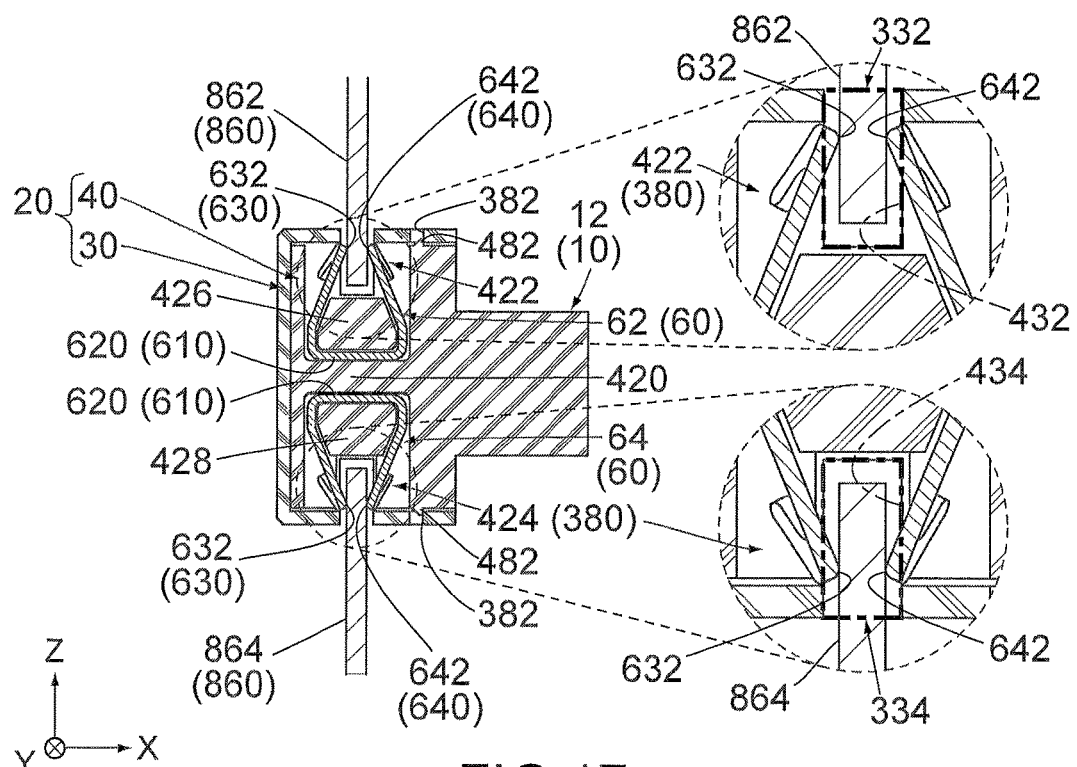
FIG. 17 is a cross-sectional view showing the connector body of FIG. 9, taken along line XVII-XVII, wherein the busbars are connected to the connector body, parts of first and second receiving portions (parts each enclosed by dashed line) are enlarged to be illustrated, and boundaries of first and second connection spaces in the enlarged views are illustrated in chain dotted line.

Referring to FIGS. 17 and 19, the busbar connection portion 330 is provided with an accommodation portion 380.

The accommodation portion 380 is a space formed inside the busbar connection portion 330 and opens outward in the sixth orientation (positive X-direction).

Referring to FIGS. 7, 8, 10, 12, 13 and 19, the busbar connection portion 330 is formed with a first opening 332 and a second opening 334. The first opening 332 and the second opening 334 are located at opposite end portions of the busbar connection portion 330 in the predetermined direction (Z-direction), respectively. Each of the first opening 332 and the second opening 334 is a space which connects the outside of the first member 30 with the accommodation portion 380, or the inside of the first member 30. The first opening 332 opens outward in the second orientation (positive Z-direction) and opens outward in the fourth orientation (positive Y-direction). The second opening 334 opens outward in the first orientation (negative Z-direction) and opens outward in the fourth orientation.

Figure 11:
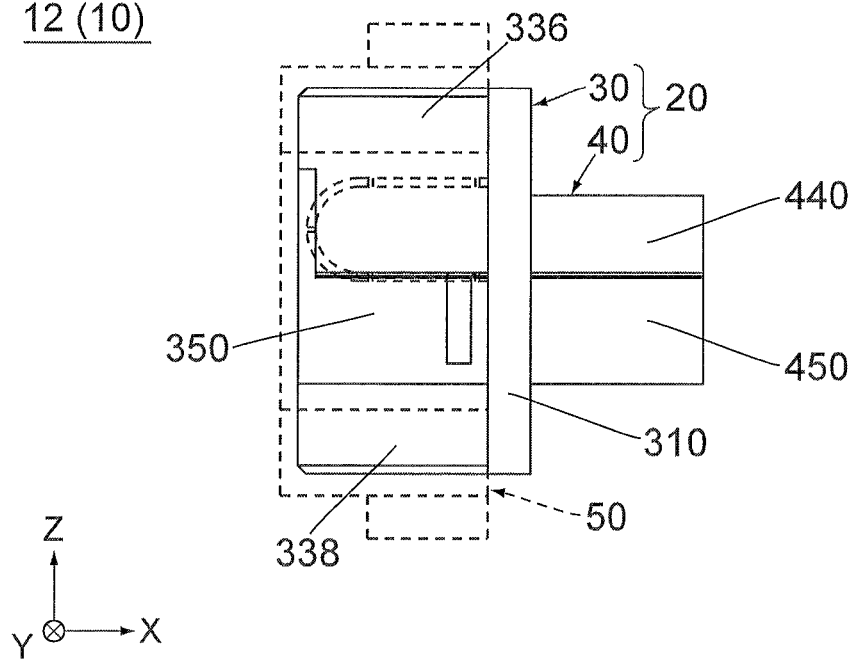
FIG. 11 is another side view showing the connector body of FIG. 7, wherein an outline of the cover of the connector is illustrated in dashed line.
Figure 12:
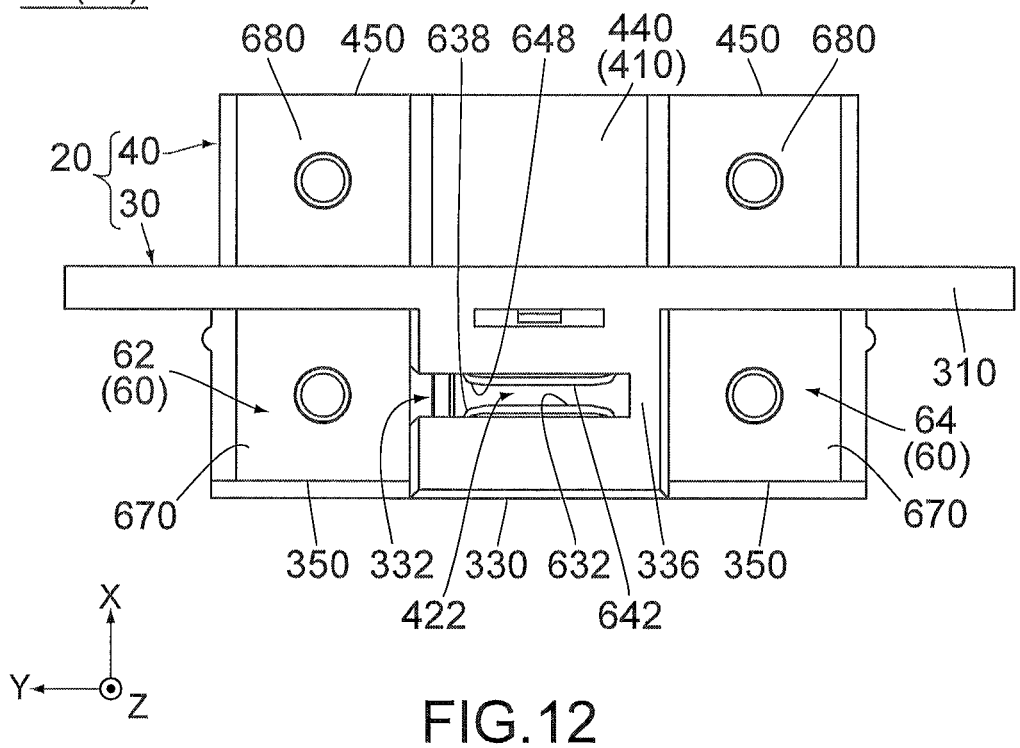
FIG. 12 is a top view showing the connector body of FIG. 7.
Figure 13:
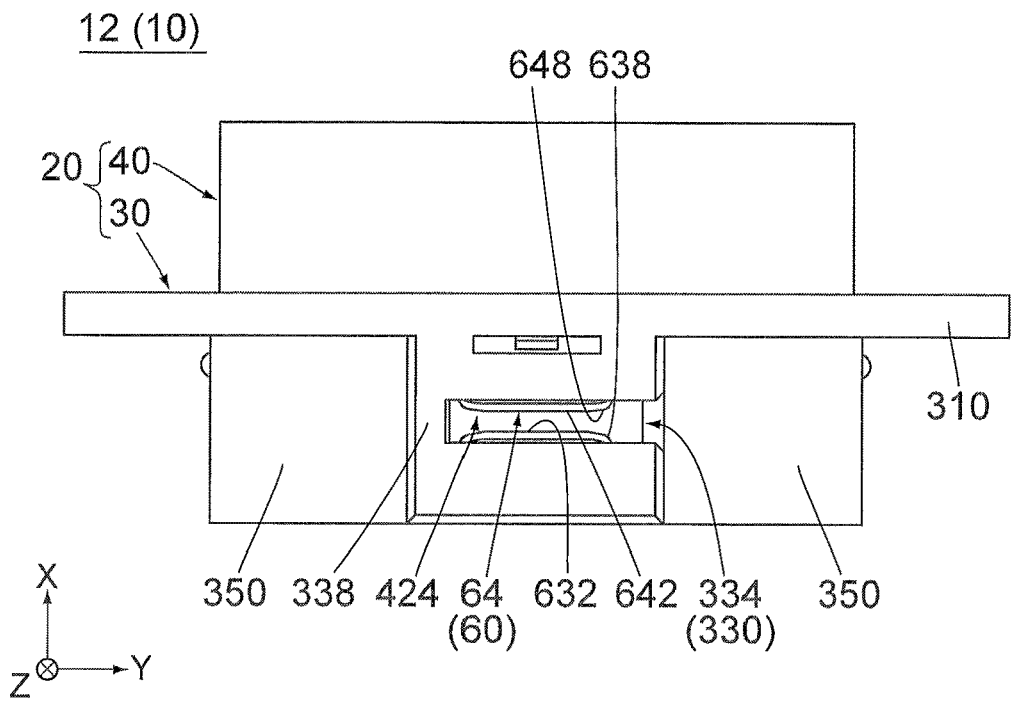
FIG. 13 is a bottom view showing the connector body of FIG. 7.
Figure 14:
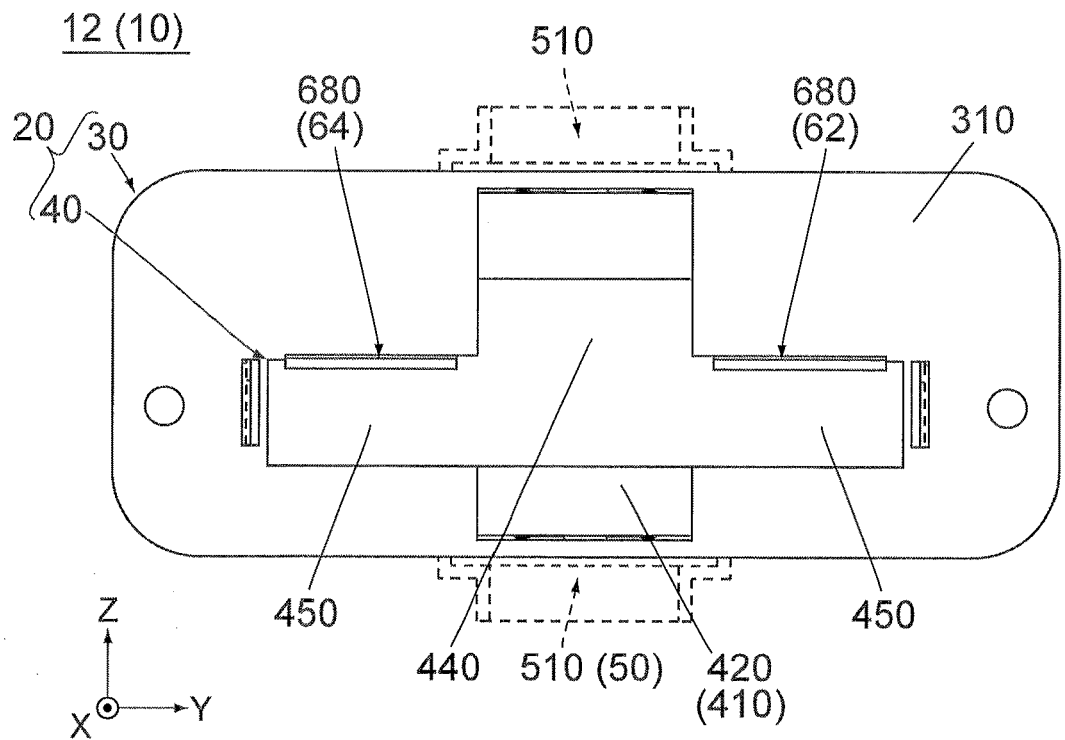
FIG. 14 is a rear view showing the connector body of FIG. 7, wherein an outline of the cover is illustrated in dashed line.
Figure 15:
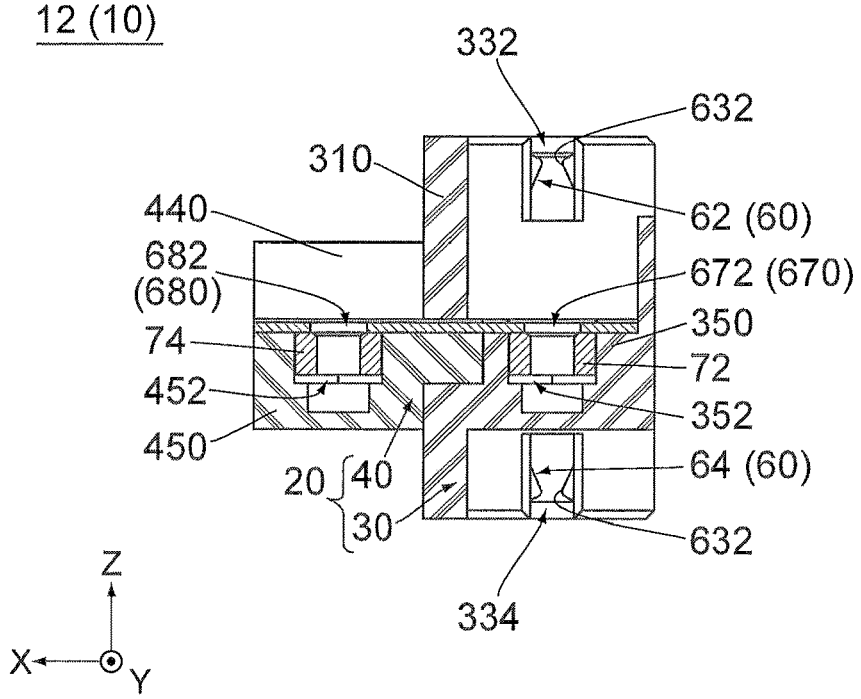
FIG. 15 is a cross-sectional view showing the connector body of FIG. 9, taken along line XV-XV.
Figure 16:
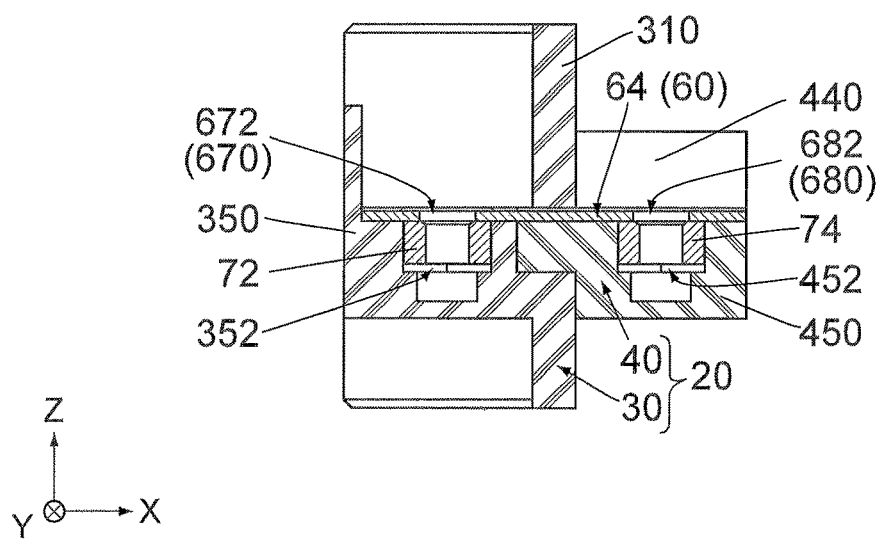
FIG. 16 is a cross-sectional view showing the connector body of FIG. 9, taken along line XVI-XVI.
Figure 18:
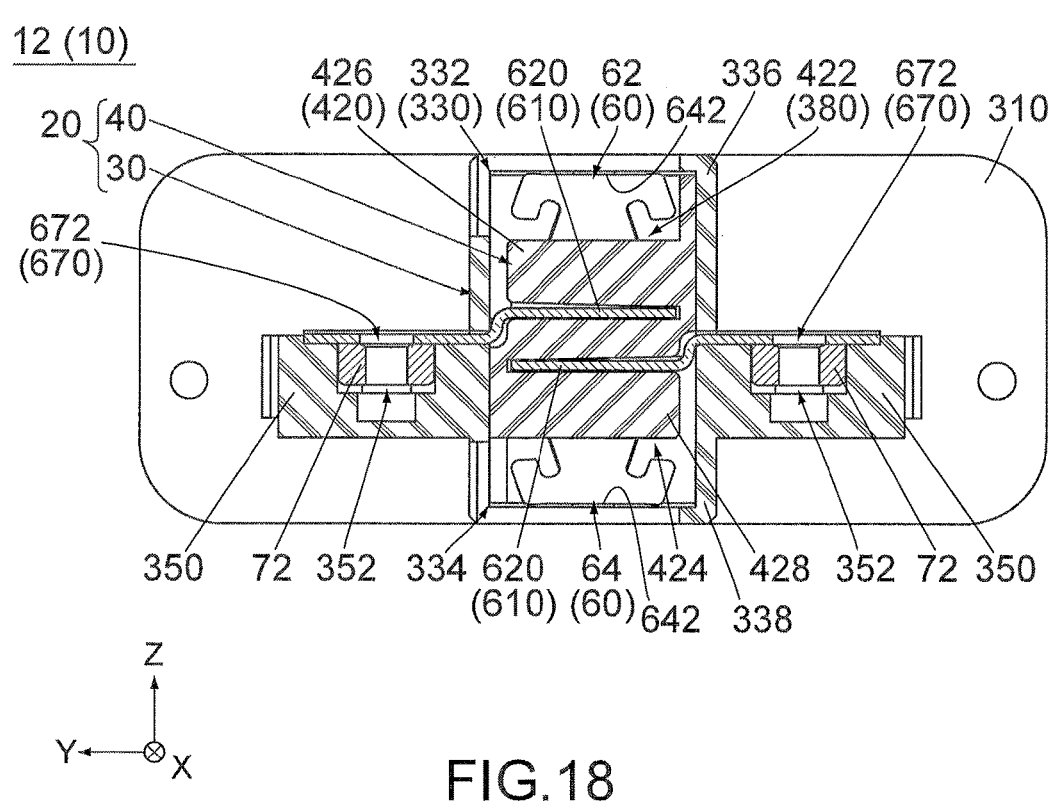
FIG. 18 is a cross-sectional view showing the connector body of FIG. 10, taken along line XVIII-XVIII.

As shown in FIGS. 7, 8, 11, 12, 13 and 19, the busbar connection portion 330 has a first protection portion 336 and a second protection portion 338. Referring to FIGS. 18 and 19, each of the first protection portion 336 and the second protection portion 338 is a part of a wall that covers the accommodation portion 380. Referring to FIGS. 7, 8 and 12, the first protection portion 336 corresponds to the first opening 332. More specifically, in the perpendicular direction (Y-direction), the first protection portion 336 blocks an end of the first opening 332 in the third orientation (negative Y-direction). Referring to FIG. 13, the second protection portion 338 corresponds to the second opening 334. More specifically, in the perpendicular direction, the second protection portion 338 blocks an end of the second opening 334 in the third orientation.

Referring to FIGS. 6, 15, 16 and 18, each of the holding portions 350 is formed with a holding hole 352. Thus, the housing 20 is formed with the two holding holes 352. Each of the holding holes 352 is a hole with a bottom and opens outward in the second orientation (positive Z-direction). Each of the holding holes 352 has a shape and a size corresponding to the nut 72. Referring to FIG. 19, each of the holding portions 350 is formed with an insertion portion 392. Each of the insertion portions 392 is a space which opens outward in the sixth orientation (positive X-direction).

As shown in FIGS. 6, 8, 12, 14 and 20, the second member 40 of the housing 20 has a base portion 410 and two additional holding portions 450. The base portion 410 is located at the middle of the second member 40 in the perpendicular direction (Y-direction). The base portion 410 has a contact holding portion 420 and a partition portion 440. The contact holding portion 420 extends between opposite ends of the second member 40 in the predetermined direction (Z-direction). The partition portion 440 is located at the middle of the contact holding portion 420 in the predetermined direction and projects along the sixth orientation (positive X-direction) from the contact holding portion 420. The additional holding portions 450 are located at opposite sides of the partition portion 440 in the perpendicular direction.

Figure 20:
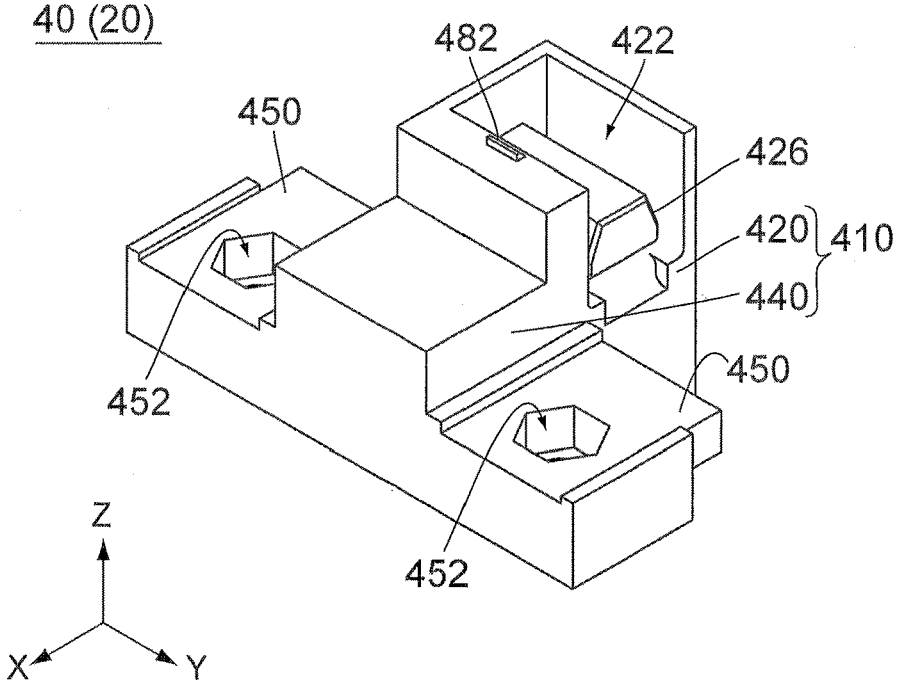
FIG. 20 is a perspective view showing a second member of the housing of the connector body of FIG. 7.

Referring to FIGS. 6, 17, 18 and 20, the contact holding portion 420 is formed with a first receiving portion 422 and a second receiving portion 424. Each of the first receiving portion 422 and the second receiving portion 424 is a space formed inside the contact holding portion 420. The first receiving portion 422 and the second receiving portion 424 are located at opposite sides of the contact holding portion 420 in the predetermined direction (Z-direction) and separated from each other in the predetermined direction by a separation wall. Referring to FIGS. 6 and 20, the first receiving portion 422 opens outward in the second orientation (positive Z-direction) and opens outward in the fourth orientation (positive Y-direction). Referring to FIG. 6, the second receiving portion 424 opens outward in the first orientation (negative Z-direction) and opens outward in the third orientation (negative Y-direction).

Referring to FIGS. 6, 17, 18 and 20, the contact holding portion 420 has a first holding portion 426 and a second holding portion 428. Referring to FIGS. 17, 18 and 20, the first holding portion 426 is located inside the first receiving portion 422 and projects along the fourth orientation (positive Y-direction) from a wall that covers the first receiving portion 422. Referring to FIGS. 6, 17 and 18, the second holding portion 428 is located inside the second receiving portion 424 and projects along the third orientation (negative Y-direction) from a wall that covers the second receiving portion 424.

As shown in FIGS. 6, 15, 16 and 20, each of the additional holding portions 450 is formed with an additional holding hole 452. Thus, the housing 20 is formed with the two additional holding holes 452. Each of the additional holding holes 452 is a hole with a bottom and opens outward in the second orientation (positive Z-direction). Each of the additional holding holes 452 has a shape and a size corresponding to the additional nut 74.

Referring to FIGS. 5 and 6, the cover 50 has a shape corresponding to a projecting portion of the first member 30 of the housing 20, or a portion that projects from the attached portion 310 along the fifth orientation (negative X-direction). The cover 50 has a space formed therewithin which has a shape corresponding to the projecting portion.

The cover 50 is provided with two busbar passages 510 and two removable walls 520. The busbar passages 510 are formed in opposite end portions of the cover 50 in the predetermined direction (Z-direction), respectively. Each of the busbar passages 510 is a space which connects the inside and the outside of the cover 50 with each other and is located at the middle of the cover 50 in the perpendicular direction (Y-direction). The removable walls 520 are located at opposite end portions of the cover 50 in the perpendicular direction, respectively. Each of the removable walls 520 is formed to be easily removable from the cover 50.

Figure 21:
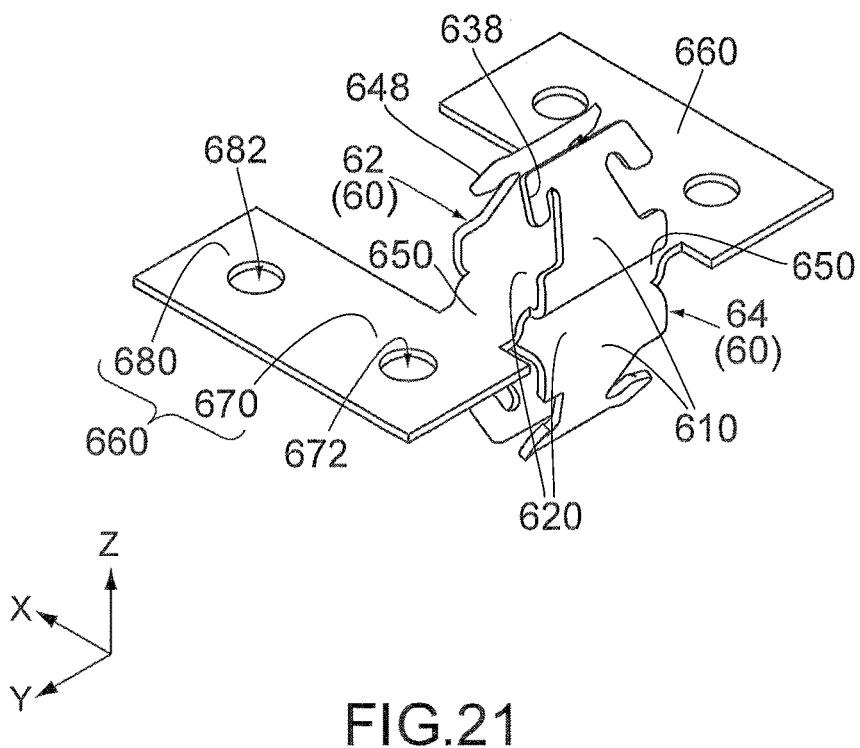
FIG. 21 is a perspective view showing two contacts of the connector body of FIG. 7.
Figure 24:
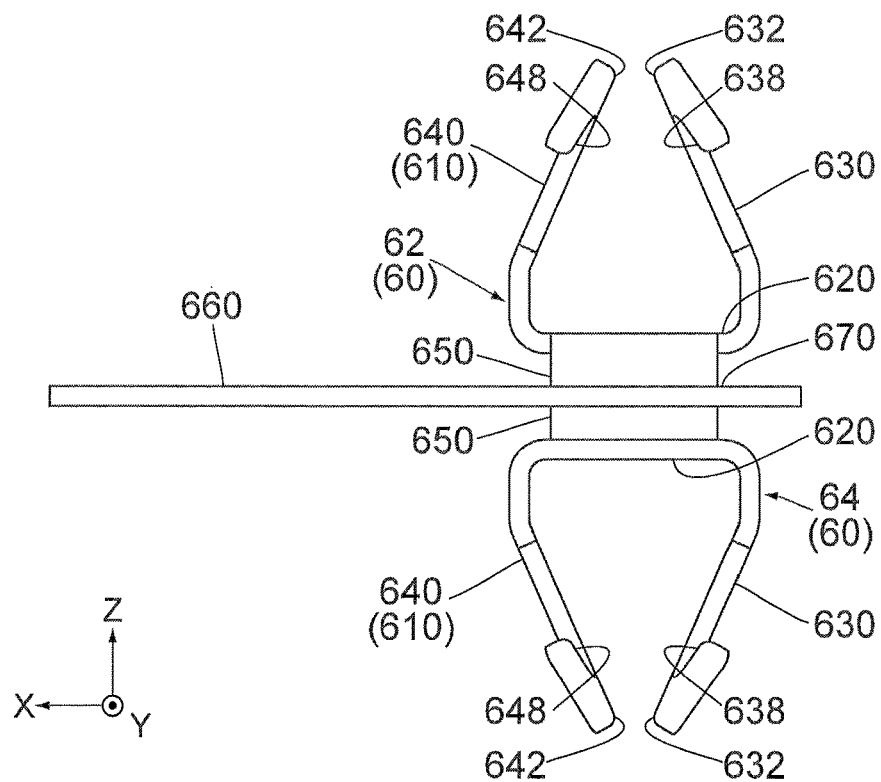
FIG. 24 is a side view showing the two contacts of FIG. 21.

Referring to FIGS. 21 and 24, in the present embodiment, each of the first contact 62 and the second contact 64 is a single metal plate with bends. Hereafter, explanation is made about a structure of the first contact 62.

Figure 22:
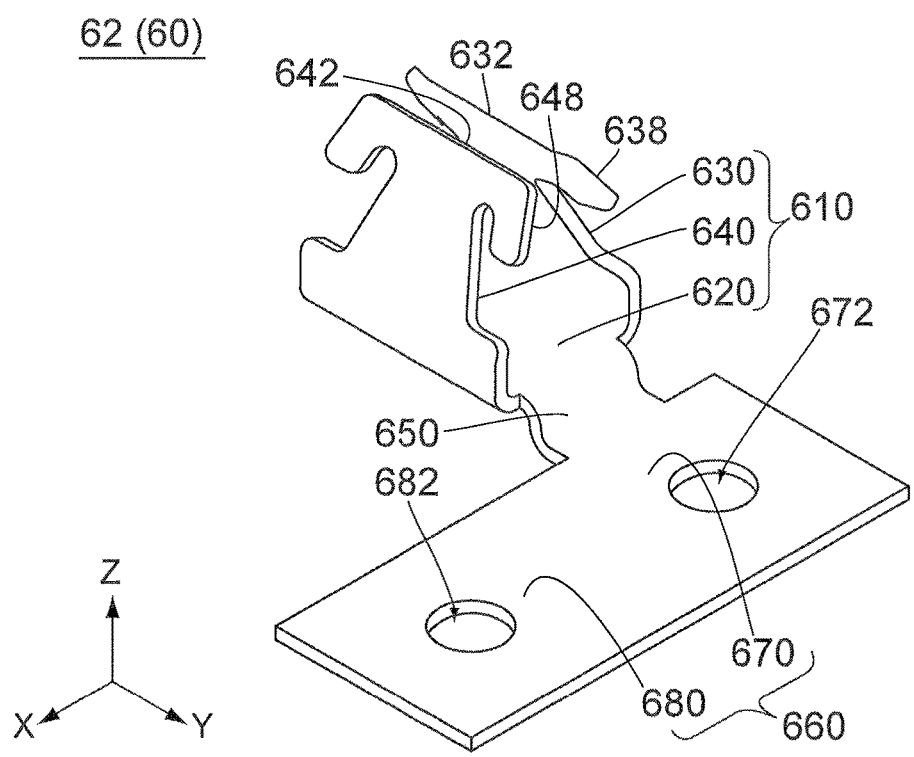
FIG. 22 is a perspective view showing a first contact of the two contacts of FIG. 21.

As shown in FIGS. 21 and 22, the first contact 62 has a main portion 610, a coupling portion 650 and a sub-portion 660. The main portion 610 has a triangular shape when the first contact 62 is seen along the third orientation (negative Y-direction). The sub-portion 660 has a rectangular flat-plate shape which extends along a perpendicular plane (XY-plane). The coupling portion 650 extends with bends and couples the main portion 610 and the sub-portion 660 to each other so that the main portion 610 and the sub-portion 660 are arranged in the perpendicular direction (Y-direction).

The main portion 610 has a held portion 620, a spring portion 630 and an additional spring portion (spring portion) 640. The held portion 620 has a rectangular flat-plate shape which extends along the perpendicular plane (XY-plane). The spring portion 630 and the additional spring portion 640 extend from opposite ends of the held portion 620 in the second perpendicular direction (X-direction), respectively, and extend along the second orientation (positive Z-direction) while approaching each other in the second perpendicular direction. Each of the spring portion 630 and the additional spring portion 640 has a fixed end that is fixed to the held portion 620 and a free end that is located opposite to the fixed end in the predetermined direction (Z-direction). In other words, each of the spring portion 630 and the additional spring portion 640 is supported by the held portion 620 as a cantilever to be resiliently deformable.

Figure 23:
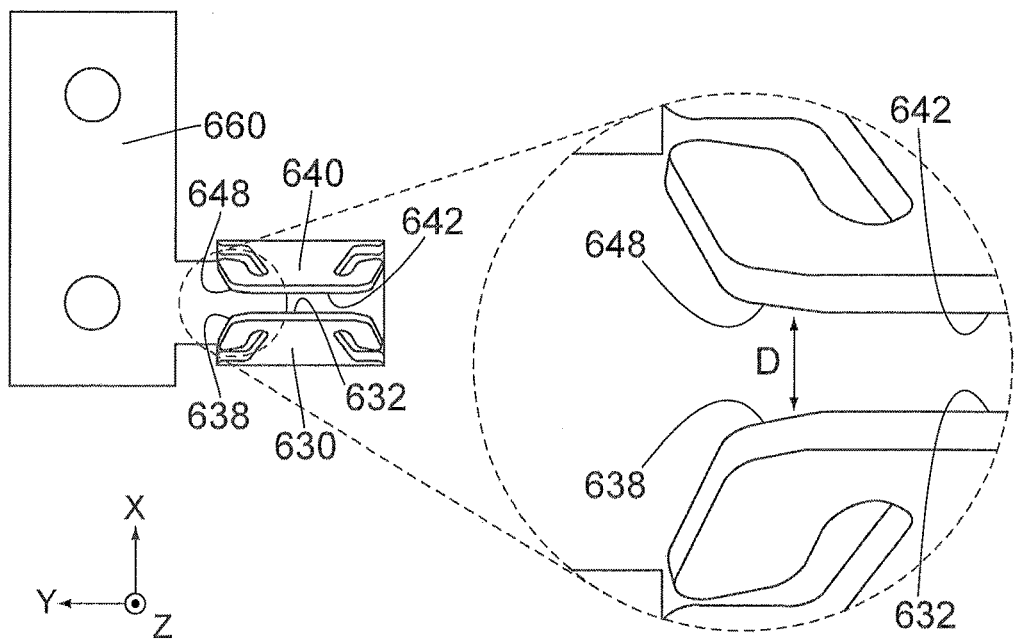
FIG. 23 is a top view showing the first contact of FIG. 22, wherein a part of the contact (part enclosed by dashed line) is enlarged to be illustrated.

As shown in FIGS. 22 and 23, the spring portion 630 has a contact portion 632 located in the vicinity of its free end, and the additional spring portion 640 has a catch portion (contact portion) 642 located in the vicinity of its free end. The contact portion 632 is movable in the second perpendicular direction (X-direction) according to resilient deformation of the spring portion 630. The catch portion 642 is movable in the second perpendicular direction according to resilient deformation of the additional spring portion 640.

As shown in FIGS. 23 and 24, the spring portion 630 is provided with a guide portion 638, and the additional spring portion 640 is provided with a guide portion 648. The guide portion 638 is an edge of a projecting portion which projects from the spring portion 630 along the fourth orientation (positive Y-direction). The guide portion 648 is an edge of another projecting portion which projects from the additional spring portion 640 along the fourth orientation. As shown in FIG. 24, a distance D between the guide portion 638 and the guide portion 648 in the second perpendicular direction (X-direction) gradually decreases along the third orientation (negative Y-direction).

Referring to FIG. 22, the sub-portion 660 has a connection portion 670 and an additional connection portion 680. The connection portion 670 is one of opposite sides of the sub-portion 660 in the second perpendicular direction (X-direction) and is adjacent to the main portion 610 in the perpendicular direction (Y-direction). The additional connection portion 680 is a remaining one of the opposite sides of the sub-portion 660 in the second perpendicular direction and projects from the connection portion 670 along the fifth orientation (positive X-direction). In the present embodiment, no visible boundary portion is provided between the connection portion 670 and the additional connection portion 680. However, the present invention is not limited thereto. For example, the connection portion 670 and the additional connection portion 680 may be separated from each other in the perpendicular direction by a visible boundary portion such as a groove or a projection. Moreover, the first contact 62 may have the coupling portion 650 and the sub-portion 660 as necessary.

The connection portion 670 is formed with an attachment hole 672. The attachment hole 672 passes through the connection portion 670 in the predetermined direction (Z-direction). The additional connection portion 680 is formed with an additional attachment hole 682. The additional attachment hole 682 passes through the additional connection portion 680 in the predetermined direction.

Referring to FIGS. 21 and 24, the second contact 64 has a shape and a size identical to those of the first contact 62. However, the second contact 64 is arranged to take a posture obtained by rotating a posture of the first contact 62 by 180 degrees about the Z-axis followed by further rotating it by 180 degrees about the Y-axis. The held portions 620 of the first contact 62 and the second contact 64 are arranged in the predetermined direction (Z-direction). The spring portion 630 and the additional spring portion 640 of the second contact 64 extend from opposite ends of the held portion 620 in the second perpendicular direction (X-direction), respectively, and extend along the first orientation (negative Z-direction) while approaching each other in the second perpendicular direction.

Referring to FIG. 24, the second contact 64 has a structure identical to that of the first contact 62 except the aforementioned difference. Thus, each of the contacts 60 has the spring portion 630, the contact portion 632, the additional spring portion 640, the catch portion 642, the connection portion 670, the additional connection portion 680 and the two guide portions 638 and 648. In each of the contacts 60, the contact portion 632 is supported by the spring portion 630 so as to be movable in the second perpendicular direction (X-direction), and the catch portion 642 is supported by the additional spring portion 640 so as to be movable in the second perpendicular direction.

Referring to FIG. 24, according to the present embodiment, in each of the first contact 62 and the second contact 64, the spring portion 630 and the additional spring portion 640 have a mirror-symmetric shape with respect to the predetermined plane (YZ-plane). Therefore, the additional spring portion 640 works similar to the spring portion 630, and the catch portion 642 works similar to the contact portion 632. However, the present invention is not limited thereto. For example, the additional spring portion 640 may have a shape and a spring force different from those of the spring portion 630. Moreover, the second contact 64 may have a shape and a size different from those of the first contact 62. However, the present embodiment is preferable in order to reduce types of components to lower manufacturing cost.

The aforementioned members are combined as describe below to form the connector body 12 (see FIG. 7).

Referring to FIG. 6, the additional nuts 74 are inserted into the additional holding holes 452 of the second member 40, respectively. The thus-inserted additional nuts 74 are received in and held by the additional holding holes 452, respectively. Then, the first contact 62 is attached to the second member 40. In detail, the main portion 610 of the first contact 62 is attached around the first holding portion 426 (see FIG. 20) of the second member 40. Meanwhile, the additional connection portion 680 of the first contact 62 is placed on one of the additional holding portions 450 so that the additional attachment hole 682 is located on the additional holding hole 452. Similarly, the second contact 64 is attached to the second member 40. In detail, the main portion 610 of the second contact 64 is attached around the second holding portion 428 of the second member 40. Meanwhile, the additional connection portion 680 of the second contact 64 is placed on a remaining one of the additional holding portions 450 so that the additional attachment hole 682 is located on the additional holding hole 452.

Then, the nuts 72 are inserted into the holding holes 352 of the first member 30, respectively. The thus-inserted nuts 72 are received in and held by the holding holes 352, respectively. Then, the second member 40 is attached to the first member 30 together with the two contacts 60, or the first contact 62 and the second contact 64. In detail, referring to FIGS. 19 and 20, the contact holding portion 420 of the second member 40 is inserted into the accommodation portion 380 of the first member 30. In this insertion, ends of the two additional holding portions 450 of the second member 40, together with the connection portions 670 of the contacts 60 (see FIG. 6), are inserted into the two insertion portions 392 of the first member 30, respectively. Referring to FIGS. 6 and 7, as a result of the aforementioned insertion, the connection portions 670 of the contacts 60 are placed on the holding portions 350, respectively, so that the attachment holes 672 are located on the holding holes 352, respectively. Referring to FIG. 17, in this state, two engagement projections 482 of the second member 40 are engaged with two engagement holes 382 of the first member 30, respectively, so that the connector body 12 is formed.

Hereafter, explanation is made about a structure and a function of the connector body 12 (connector 10) formed as described above.

Figure 10:
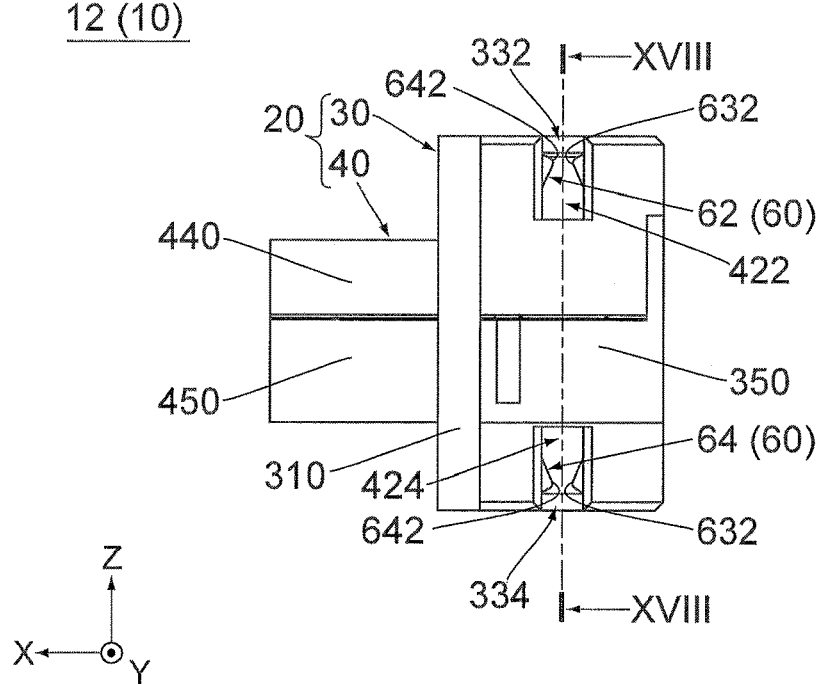
FIG. 10 is a side view showing the connector body of FIG. 7.

Referring to FIGS. 7 and 10, the housing 20 is formed with the first opening 332 and the second opening 334. As shown in FIGS. 10 and 12, the first opening 332 is visible when the housing 20 is seen along the first orientation (negative Z-direction) in the predetermined direction (Z-direction) and is visible when the housing 20 is seen along the third orientation (negative Y-direction) in the perpendicular direction (Y-direction) perpendicular to the predetermined direction. As shown in FIGS. 10 and 13, the second opening 334 is visible when the housing 20 is seen along the second orientation (positive Z-direction) opposite to the first orientation and is visible when the housing 20 is seen along the third orientation.

Referring to FIGS. 17 and 18, each of the first receiving portion 422 and the second receiving portion 424 is arranged inside the housing 20 as a part of the accommodation portion 380. In other words, the housing 20 is formed with the first receiving portion 422 and the second receiving portion 424. Each of the contacts 60 is held by the housing 20. In detail, the main portion 610 of the first contact 62 is located inside the first receiving portion 422, and the held portion 620 is held by the first holding portion 426. The main portion 610 of the second contact 64 is located inside the second receiving portion 424, and the held portion 620 is held by the second holding portion 428. The contact portion 632 and the catch portion 642 of the thus-held first contact 62 are located inside the first receiving portion 422. Similarly, the contact portion 632 and the catch portion 642 of the second contact 64 are located inside the second receiving portion 424.

Figure 3:
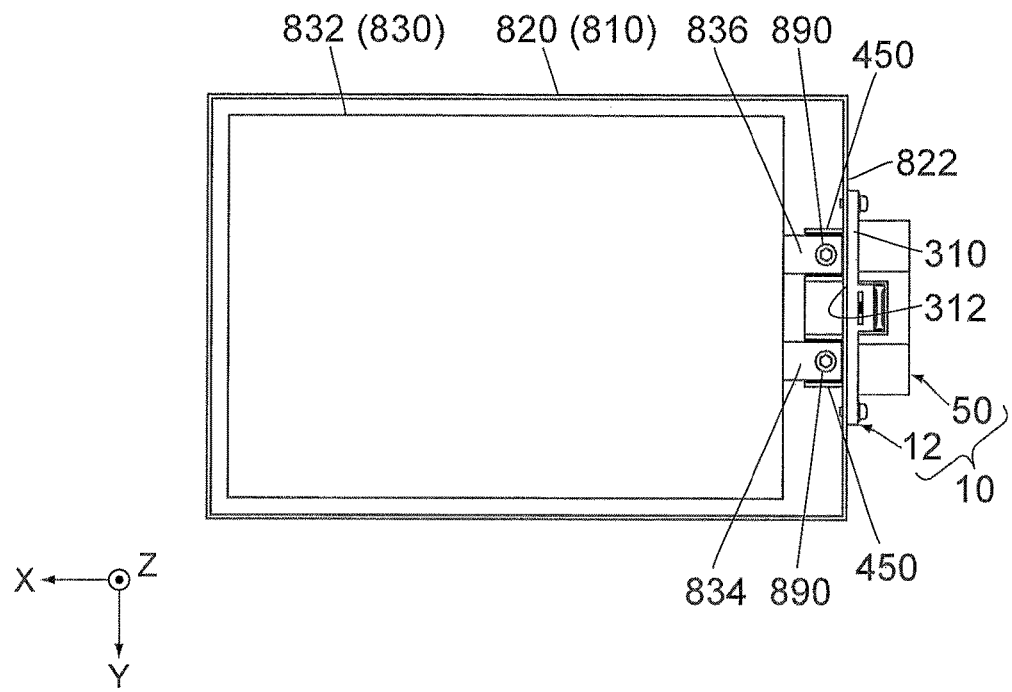
FIG. 3 is a top view showing the battery unit and the connector of FIG. 2, wherein the top plate of the case is not illustrated.

Referring to FIG. 2, in the present embodiment, the connector body 12 is attached to the battery unit 810 when used. Referring to FIGS. 2 and 3, the battery unit 810 comprises a case 820 with a panel (object) 822 in addition to the battery module 830. The battery module 830 is accommodated inside the case 820. The battery module 830 has a body portion 832 and two terminals 834 and 836. One of the terminals 834 and 836 is connected to the positive electrode of the body portion 832, and a remaining one of the terminals 834 and 836 is connected to the negative electrode of the body portion 832. The attached portion 310 of the connector body 12 is attached and fixed to the panel 822 of the case 820 by screws passing through the attachment holes 314. The thus-fixed attached surface 312 is in contact with the panel 822.

Referring to FIG. 3, the additional holding portions 450 of the connector body 12, together with the additional connection portions 680 of the contacts 60 (see FIG. 8), pass through a hole (not shown) of the panel 822 and project inside the case 820. Referring to FIG. 3 together with FIG. 5, the terminals 834 and 836 of the battery module 830 are fixed to the additional connection portions 680, respectively, by bolts 890 and the additional nuts 74 (see FIGS. 15 and 16) so that the connector body 12 is electrically connected with the battery module 830.

Referring to FIG. 8, the connector body 12 has a projecting portion which consists of the partition portion 440, the two additional holding portions 450 and the two additional connection portions 680. The projecting portion projects from the attached portion 310 along the sixth orientation (positive X-direction) and has an asymmetrical shape in the predetermined direction (Z-direction). The hole (not shown) of the panel 822 (see FIG. 3) has a shape which corresponds to this asymmetrical shape. Therefore, the connector body 12 is attachable to the panel 822 only under a state where the partition portion 440 projects beyond the additional holding portions 450 along the second orientation (positive Z-direction).

Referring to FIG. 1, two of the connector bodies 12 that are adjacent to each other in the predetermined direction (Z-direction) are connected with each other by one of the busbars 860. In detail, referring to FIG. 2, two of the busbars 860 are connected to opposite sides of the connector body 12 in the predetermined direction, respectively: Each of the busbars 860 is formed of conductor such as metal and has a rectangular flat-plate shape. More specifically, each of the busbars 860 is a metal plate having a simple rectangular shape.

One of the busbars 860 is a first busbar 862 that extends from the connector body 12 along the second orientation (positive Z-direction), and a remaining one of the busbars 860 is a second busbar 864 that extends from the connector body 12 along the first orientation (negative Z-direction). The connector body 12 is connectable to the first busbar 862 and the second busbar 864 of the two busbars 860. In the present embodiment, the first busbar 862 and the second busbar 864 have identical shapes and sizes. However, the present invention is not limited thereto, but the first busbar 862 and the second busbar 864 may have different shapes and sizes to some extent.

Figure 25:
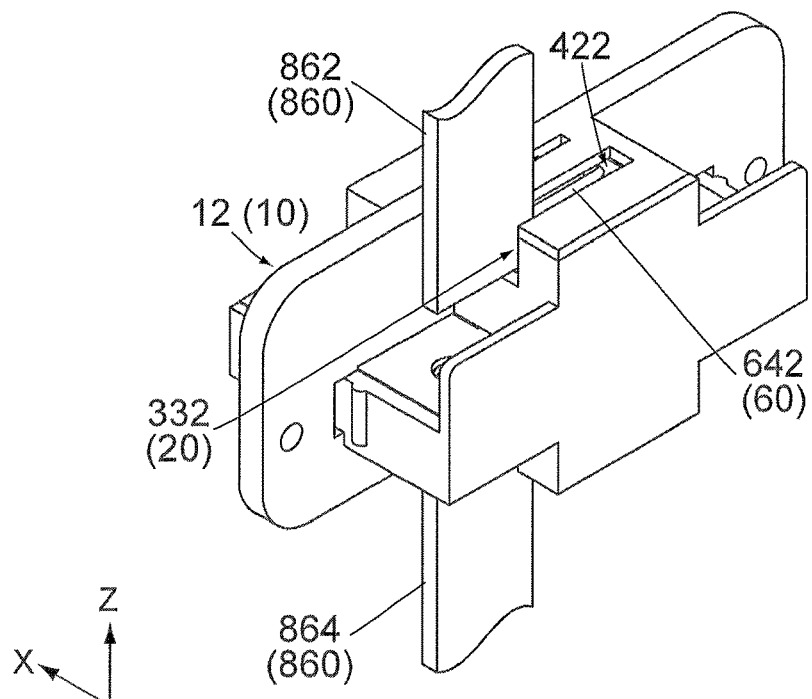
FIG. 25 is a perspective view showing the connector body of FIG. 7 together with the two busbars, wherein each of the busbars is under a state where connection to the connector body starts.

Referring to FIG. 25 together with FIG. 10, an end of the first busbar 862 is inserted into the first receiving portion 422 through the first opening 332 along the third orientation (negative Y-direction), and an end of the second busbar 864 is inserted into the second receiving portion 424 through the second opening 334 along the third orientation. The first, receiving portion 422 partially receives the first busbar 862 when the first busbar 862 is inserted through the first opening 332. The second receiving portion 424 partially receives the second busbar 864 when the second busbar 864 is inserted through the second opening 334.

As shown in FIGS. 10 and 12, the contact portion 632 and the catch portion 642 of the first contact 62 are visible through the first opening 332 both when the housing 20 is seen along the first orientation (negative Z-direction) and when the housing 20 is seen along the third orientation (negative Y-direction). As shown in FIGS. 10 and 13, the contact portion 632 and the catch portion 642 of the second contact 64 are visible through the second opening 334 both when the housing 20 is seen along the second orientation (positive Z-direction) and when the housing 20 is seen along the third orientation.

In detail, referring to FIG. 17, the contact portion 632 and the catch portion 642 of the first contact 62 are located inside a first connection space 432 which is a part of the first receiving portion 422. The first opening 332 defines a boundary (see chain dotted line in FIG. 17) of the first connection space 432 in a second perpendicular plane (XZ-plane) and defines another boundary of the first connection space 432 in the perpendicular plane (XY-plane). The contact portion 632 and the catch portion 642 of the second contact 64 are located inside a second connection space 434 which is a part of the second receiving portion 424. The second opening 334 defines a boundary (see chain dotted line in FIG. 17) of the second connection space 434 in the second perpendicular plane and defines another boundary of the second connection space 434 in the perpendicular plane.

As shown in FIG. 17, the contact portion 632 and the catch portion 642 of the first contact 62, which are arranged as described above, are brought into contact with the first busbar 862 when the first busbar 862 is partially received in the first connection space 432 of the first receiving portion 422. Similarly, the contact portion 632 and the catch portion 642 of the second contact 64, which are arranged as described above, are brought into contact with the second busbar 864 when the second busbar 864 is partially received in the second connection space 434 of the second receiving portion 424. As a result, the connector body 12 is electrically connected with each of the first busbar 862 and the second busbar 864. Referring to FIG. 17 together with FIG. 5, the terminal 834 of the battery module 830 is electrically connected with the first busbar 862, and the terminal 836 is electrically connected with the second busbar 864.

As described above, each of the first opening 332 and the second opening 334 according to the present embodiment allows the insertion of the busbar 860 along the third orientation (negative Y-direction). Referring to FIG. 17 together with FIG. 1, under a state where the first opening 332 of the connector 10 is arranged to face the second opening 334 of the other connector 10 in the predetermined direction (Z-direction), only by moving the busbar 860 of a simple rectangular shape along the third orientation, one of the ends of the busbar 860 is inserted into the first opening 332 to be connected with the connector 10, and a remaining one of the ends of the busbar 860 is inserted into the second opening 334 to be connected with the other connector 10. Thus, the connector 10 according to the present embodiment is connectable with the other connector 10 via the busbar 860 of a simple shape.

Referring to FIGS. 10 and 11, the housing 20 has the first protection portion 336 and the second protection portion 338. The first protection portion 336 hides the first opening 332 when the housing 20 is seen along the fourth orientation (positive Y-direction) opposite to the third orientation (negative Y-direction). The second protection portion 338 hides the second opening 334 when the housing 20 is seen along the fourth orientation. According to the present embodiment, the first protection portion 336 stops the movement of the first busbar 862 (see FIG. 25) along the third orientation. The second protection portion 338 stops the movement of the second busbar 864 (see FIG. 25) along the third orientation.

Referring to FIG. 18, if the first protection portion 336 and the second protection portion 338 are not provided, the first busbar 862 (see FIG. 25) inserted into the first receiving portion 422 along the third orientation (negative Y-direction) and the second busbar 864 (see FIG. 25) inserted into the second receiving portion 424 along the third orientation might be moved to the holding portion 350 through the first receiving portion 422 and the second receiving portion 424. In particular, if the first busbar 862 is moved to the holding portion 350 which is provided with the connection portion 670 of the second contact 64, the first busbar 862 might be brought into contact with the connection portion 670 of the second contact 64. However, according to the present embodiment, since the first protection portion 336 and the second protection portion 338 are provided, the first busbar 862 and the second busbar 864 are stopped to be securely kept inside the first receiving portion 422 and the second receiving portion 424, respectively. However, the present invention is not limited thereto, but the first protection portion 336 and the second protection portion 338 may be provided as necessary.

Referring to FIGS. 17 and 18, each of the contact portion 632 and the catch portion 642 in each of the contacts 60 of the present embodiment is located between the connection portions 670 of the two contacts 60 in the perpendicular direction (Y-direction). Moreover, the contact portions 632 of the two contacts 60 are arranged in the predetermined direction (Z-direction), and the catch portions 642 of the two contacts 60 are arranged in the predetermined direction. When the first busbar 862 is inserted, the contact portion 632 and the catch portion 642 of the first contact 62 equivalently apply spring forces to the first busbar 862 which is partially received in the first receiving portion 422 and hold the first busbar 862 therebetween. Similarly, when the second busbar 864 is inserted, the contact portion 632 and the catch portion 642 of the second contact 64 equivalently apply spring forces to the second busbar 864 which is partially received in the second receiving portion 424 and hold the second busbar 864 therebetween. This holding mechanism securely connects each of the contacts 60 to the busbar 860.

However, the present invention is not limited thereto. For example, the catch portion 642 may be supported so as to apply a spring force stronger than that of the contact portion 632. In this case, when the busbar 860 is inserted, the catch portion 642 may be hardly moved and catch the busbar 860. Moreover, the catch portion 642 of the first contact 62 may be supported by a part of the second member 40 such as an inner wall of the first receiving portion 422 so as to be unmovable. Similarly, the catch portion 642 of the second contact 64 may be supported by a part of the second member 40 such as an inner wall of the second receiving portion 424 so as to be unmovable.

Referring to FIGS. 12 and 24, the two guide portions 638 and 648 of the first contact 62 open along the fourth orientation (positive Y-direction) and guide the first busbar 862 (see FIG. 25) when the first busbar 862 is inserted through the first opening 332. Referring to FIGS. 13 and 24, the two guide portions 638 and 648 of the second contact 64 open along the fourth orientation and guide the second busbar 864 (see FIG. 25) when the second busbar 864 is inserted through the second opening 334. According to the present embodiment, since the guide portions 638 and 648 are provided, each of the busbars 860 (see FIG. 25) can be smoothly inserted. However, the present invention is not limited thereto, but the guide portions 638 and 648 may be provided as necessary.

Figure 9:
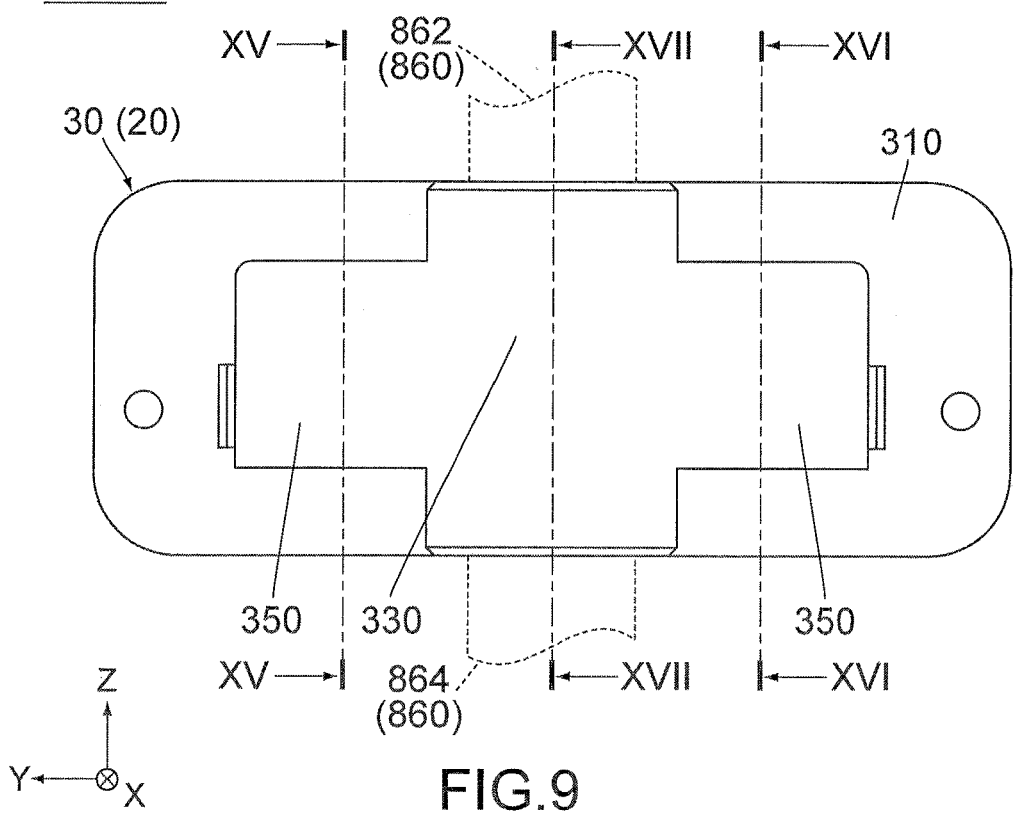
FIG. 9 is a front view showing the connector body of FIG. 7, wherein outlines of the busbars connected to the connector body are illustrated in dashed line.

As shown in FIG. 9, each of the opposite ends of the busbar connection portion 330 of the present embodiment in the predetermined direction (Z-direction) has a rectangular shape when the housing 20 is seen along the third orientation (negative Y-direction). As shown in FIGS. 10 and 12, a part of the first opening 332 extends in the predetermined direction, and a remaining part of the first opening 332 extends in the perpendicular direction (Y-direction). Thus, the first opening 332 of the present embodiment continuously extends along the predetermined plane (YZ-plane) defined by the predetermined direction and the perpendicular direction. As shown in FIGS. 10 and 13, a part of the second opening 334 extends in the predetermined direction, and a remaining part of the second opening 334 extends in the perpendicular direction. Thus, the second opening 334 of the present embodiment continuously extends along the predetermined plane.

However, the present invention is not limited thereto. The end of the busbar connection portion 330 in the predetermined direction (Z-direction) may be formed in various shapes such as a trapezoidal shape and an arc-shape. Each of the first opening 332 and the second opening 334 may be formed in various shapes in accordance with the shape of the end of the busbar connection portion 330. For example, each of the first opening 332 and the second opening 334 may extend in an arc-shape along the predetermined plane (YZ-plane).

Referring to FIGS. 10, 12 and 13, in the present embodiment, the first opening 332 and the second opening 334 extend in a common plane. In addition, the first opening 332 and the second opening 334 are located at positions same as each other in the perpendicular direction (Y-direction). Referring to FIGS. 1, 10, 12 and 13, when two of the connectors 10 adjacent to each other in the predetermined direction (Z-direction) are located at positions same as each other in the perpendicular direction and the attached surfaces 312 (see FIG. 2) of the two connectors 10 are located in a common plane, the busbar 860 can be easily inserted into the first opening 332 and the second opening 334.

However, the present invention is not limited thereto. As described below with examples, because the busbar 860 has a simple shape, the busbar 860 is flexibly adaptable to a positional difference between the first opening 332 and the second opening 334 facing each other of the two connectors 10. Referring to FIG. 17, when a size of each of the first opening 332 and the second Opening 334 in the second perpendicular direction (X-direction) is made sufficiently larger than a thickness of the busbar 860, or a size of the busbar 860 in the second perpendicular direction (see FIG. 17), the busbar 860 is particularly flexibly adaptable to the positional difference.

Figure 26:
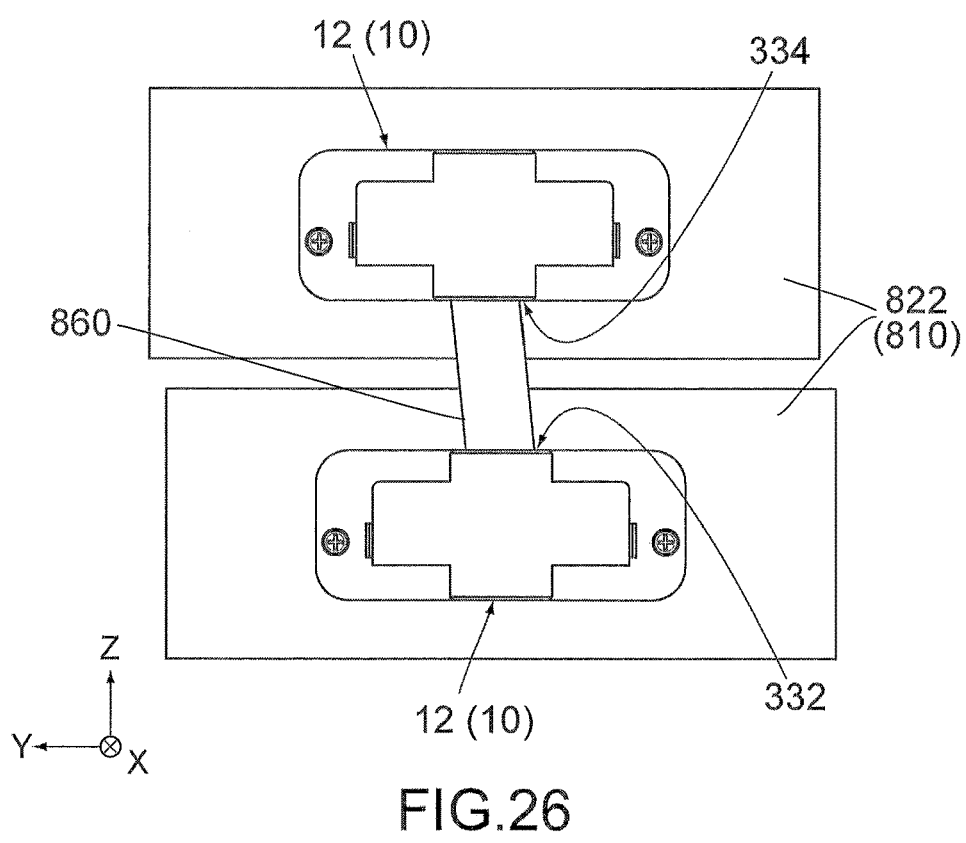
FIG. 26 is a front view showing two of the battery units of the power storage device of FIG. 1, wherein the connector bodies are attached to the battery units, respectively, and the two connector bodies are connected with each other via the busbar.

Referring to FIG. 26, the two connector bodies 12 adjacent to each other in the predetermined direction (Z-direction) may be located at different positions in the perpendicular direction (Y-direction) to some extent. Even in this arrangement, the two connector bodies 12 can be connected with each other by the busbar 860.

Figure 27:
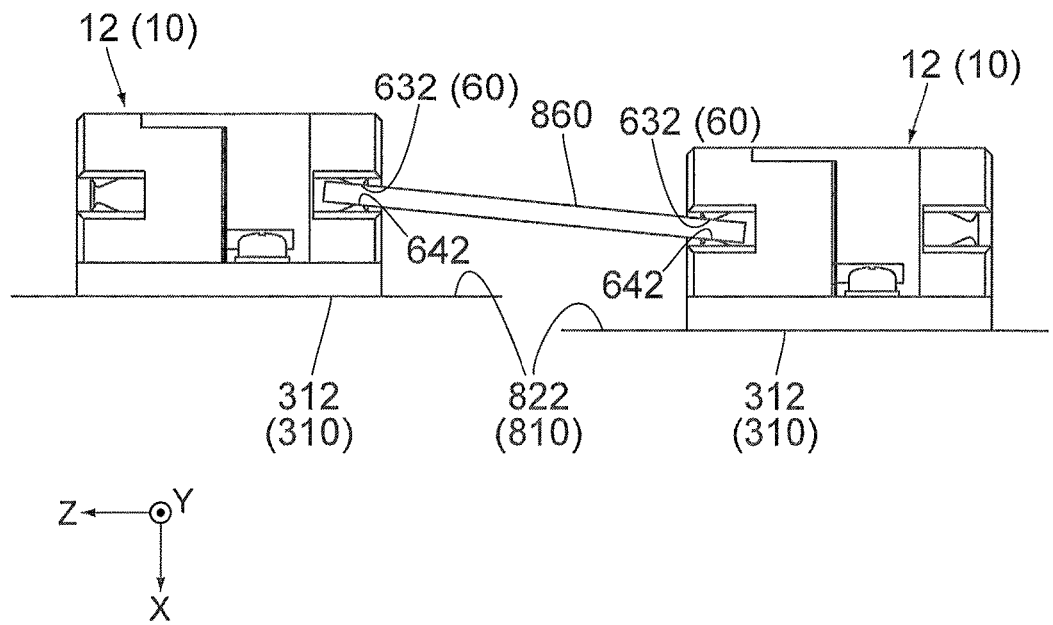
FIG. 27 is a side view showing the battery units, the connector bodies and the busbar of FIG. 26.

Referring to FIG. 27, the two connector bodies 12 adjacent to each other in the predetermined direction (Z-direction) may be located at different positions in the second perpendicular direction (X-direction). In other words, the attached surfaces 312 of the two connector bodies 12 may be not in the common plane but in two planes in parallel to each other. Even in this arrangement, the two connector bodies 12 can be connected with each other by the busbar 860.

Figure 28:
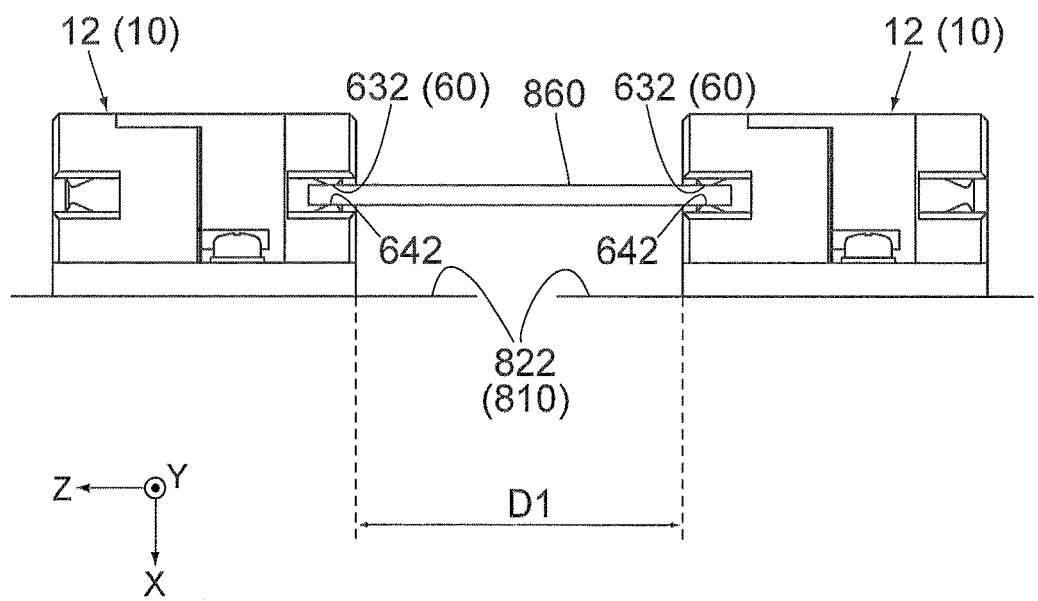
FIG. 28 is another side view showing the battery units, the connector bodies and the busbar of FIG. 26.
Figure 29:
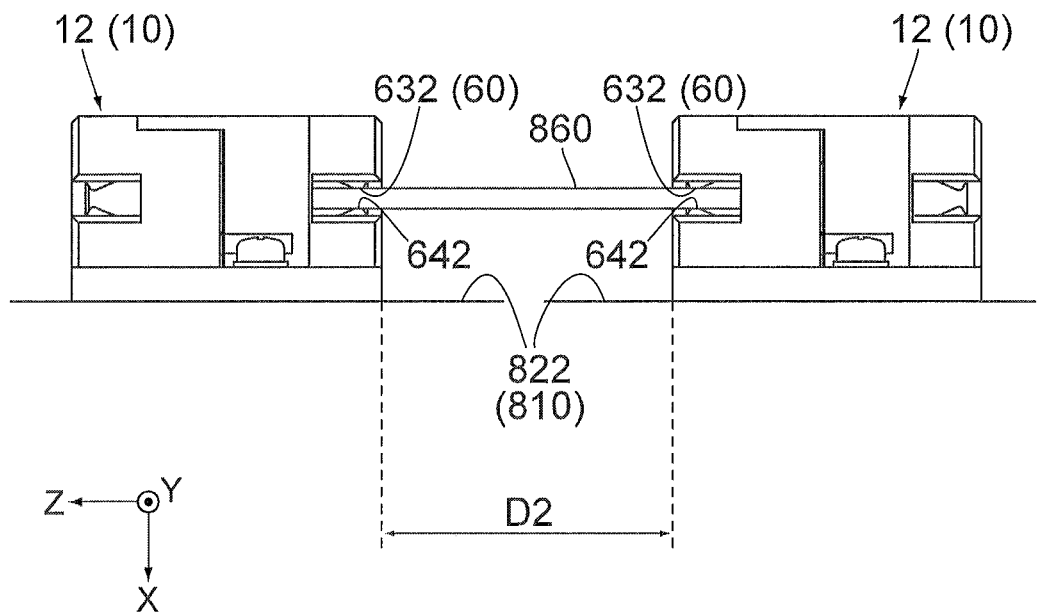
FIG. 29 is still another side view showing the battery units, the connector bodies and the busbar of FIG. 26.

Referring to FIGS. 28 and 29, a distance between the two connector bodies 12 adjacent to each other in the predetermined direction (Z-direction) may be changed to some extent. For example, a distance between the two connector bodies 12 adjacent to each other in the predetermined direction may be D1, and another distance between the other two connector bodies 12 adjacent to each other in the predetermined direction may be not D1 but D2. For example, D1 may be larger than D2.

Moreover, according to the present embodiment, because the busbar 860 has a simple shape, the arrangement of the first opening 332 and the second opening 334 in the one connector 10 can be variously modified. Referring to FIGS. 12 and 13, for example, in the connector body 12, a position of the first opening 332 in the perpendicular direction (Y-direction) may be different from another position of the second opening 334 in the perpendicular direction to some extent. In the connector body 12, a position of the first opening 332 in the second perpendicular direction (X-direction) may be different from another position of the second opening 334 in the second perpendicular direction to some extent. Moreover, the first opening 332 and the second opening 334 may extend along a plane that is in parallel to the predetermined direction (Z-direction) and oblique to the second perpendicular direction to some extent.

Referring to FIG. 4, after the two busbars 860 are connected to the connector body 12, the cover 50 is attached to the connector body 12. As can be seen from FIGS. 4, 10 and 11, the cover 50 hides, at least in part, each of the first opening 332 and the second opening 334 when the connector 10 is seen along the third orientation (negative Y-direction). The thus-attached cover 50 prevents the busbar 860 from coming off. However, the present invention is not limited thereto, but the connector 10 may comprise the cover 50 as necessary.

Figure 30:
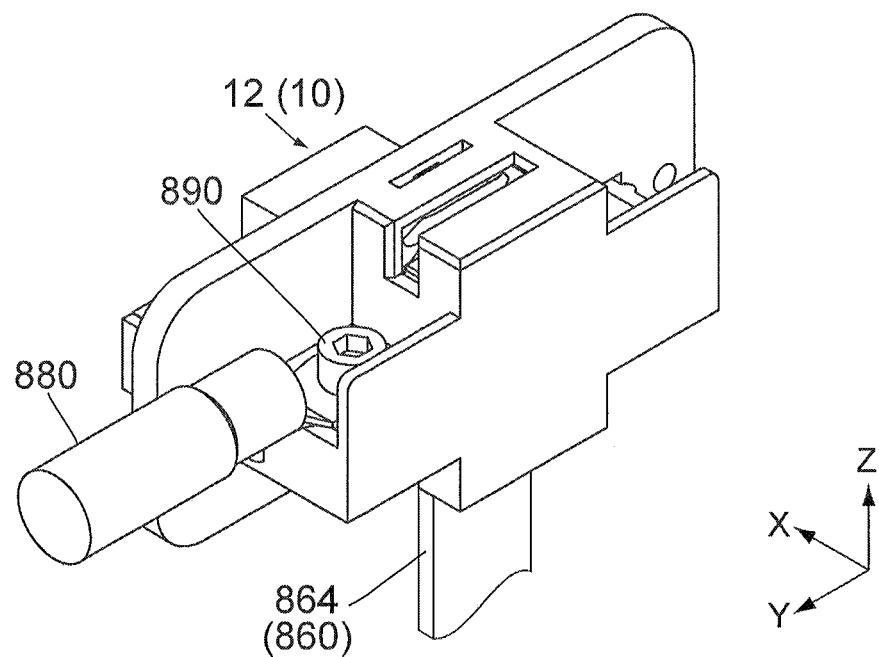
FIG. 30 is a perspective view showing the connector body of FIG. 7 together with the busbar and a cable, wherein each of the busbar and the cable is connected to the connector body.

Referring to FIGS. 1 and 30, two of the connectors 10 that are not adjacent to each other in the predetermined direction (Z-direction) can be connected by the cable 880. In detail, referring to FIGS. 7 and 30, the cable 880 is fixed to the connection portion 670 by the bolt 890 and the nut 72 (see FIG. 18), so that the connector body 12 is electrically connected with the cable 880. Thus, each of the connection portions 670 is connectable to the connection member other than the busbar 860. The connection member in the present embodiment is the cable 880. Referring to FIGS. 1 and 7, according to the present embodiment, since the connection portions 670 are provided, a plurality of the connectors 10 in various arrangements can be connected with one another by using the busbars 860 and the cables 880. However, the present invention is not limited thereto, but the connection member may be a member other than the cable 880.

Figure 31:
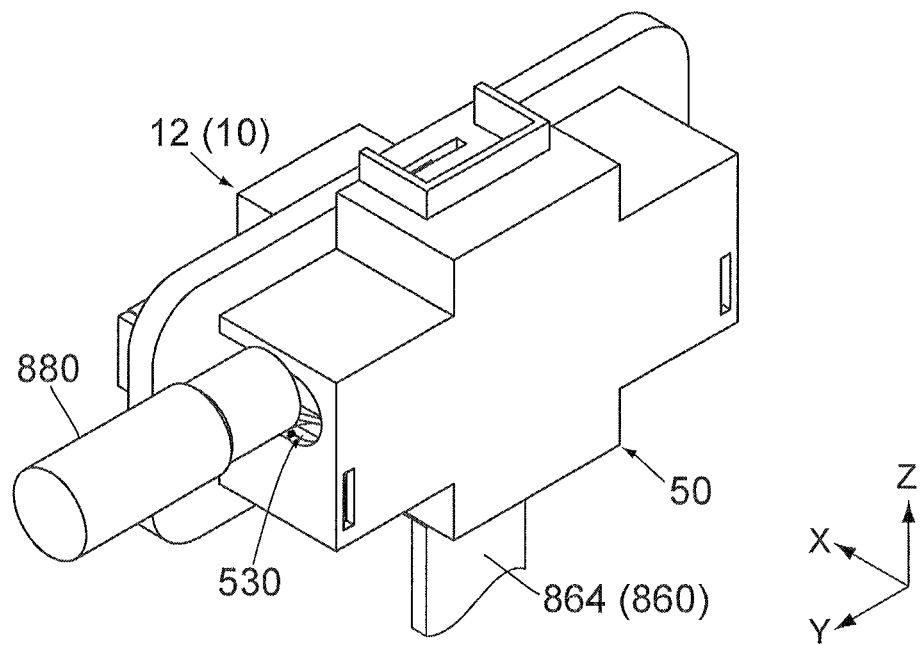
FIG. 31 is a perspective view showing the connector body, the busbar and the cable of FIG. 30, wherein the cover is attached to the connector body.

Referring to FIG. 31, after the busbar 860 and the cable 880 are connected to the connector body 12, the cover 50 is formed with a cable passage 530 by removing the removable wall 520 (see FIG. 4) and is attached to the connector body 12. The cable 880 passes through the thus-formed cable passage 530 to extend outward of the connector 10.

The aforementioned embodiment can be further variously modified in addition to the already explained modifications.

Referring to FIGS. 10 and 11, the positions of the first opening 332 and the first protection portion 336 may be exchanged, and the positions of the second opening 334 and the second protection portion 338 may be exchanged. Referring to FIG. 25, in this modification, the busbar 860 is insertable to the connector body 12 not along the negative Y-direction but along the positive Y-direction. In other words, the third orientation in this modification is not the negative Y-direction but the positive Y-direction.

Figure 32:
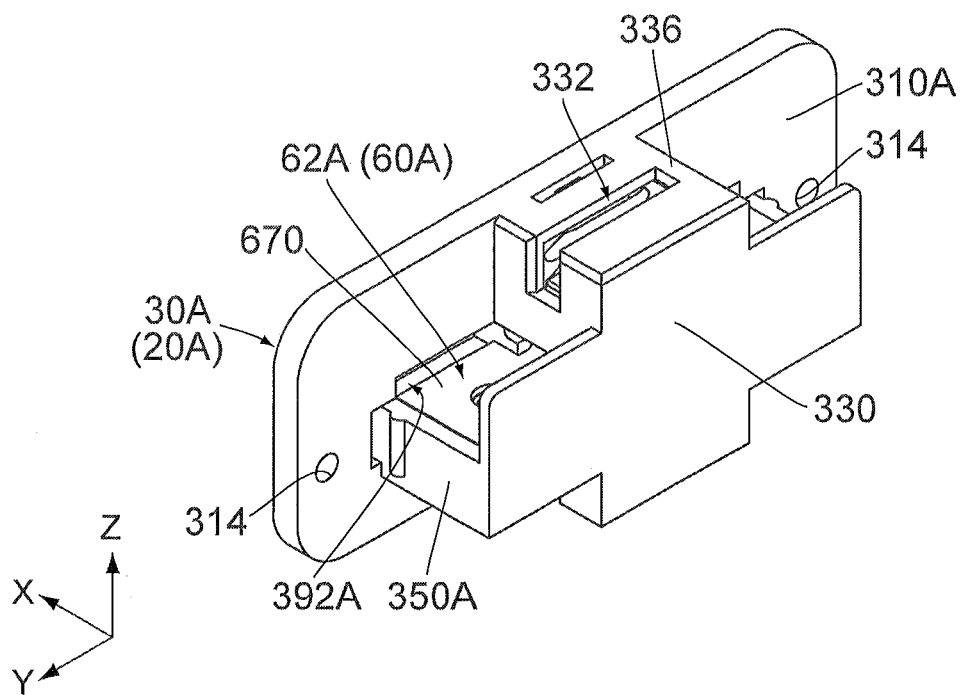
FIG. 32 is a perspective view showing a modification of the connector body of FIG. 7.

Referring to FIG. 32, a connector 10A according to a modification comprises a connector body 12A and the cover 50 (see FIG. 4). Referring to FIGS. 33, 36, 38 and 39, the connector body 12A comprises a housing 20A made of insulator, two contacts 60A each made of metal, namely a first contact 62A and a second contact 64A, and the two nuts 72. The housing 20A comprises a first member 30A and a second member 40A.

Referring to FIGS. 32, 33, 38 and 39 together with FIG. 19, the first member 30A of the housing 20A has an attached portion 310A which is different from the attached portion 310 of the first member 30 of the housing 20 and two holding portions 350A which are different from the holding portions 350 of the first member 30. The attached portion 310A is formed with two passages 392A which correspond to the holding portions 350A, respectively. Each of the passages 392A passes through the attached portion 310A in the second perpendicular direction (X-direction). Each of the holding portions 350A is not formed with the insertion portion 392. Except for the aforementioned difference, the first member 30A has a structure identical to that of the first member 30 (see FIG. 19) of the housing 20.

Figure 33:
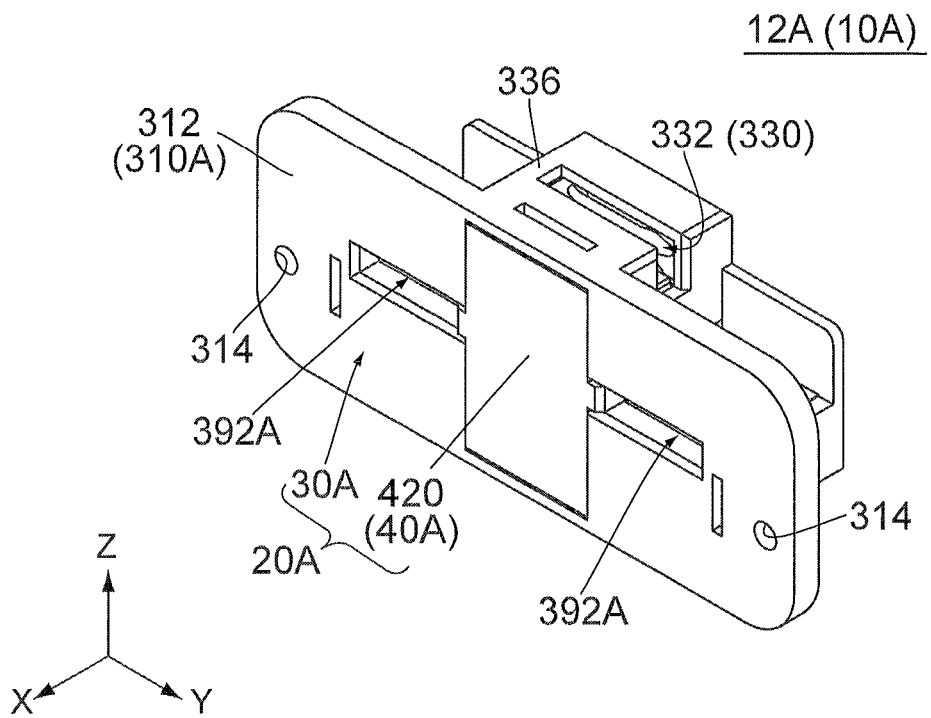
FIG. 33 is another perspective view showing the connector body of FIG. 32.
Figure 34:
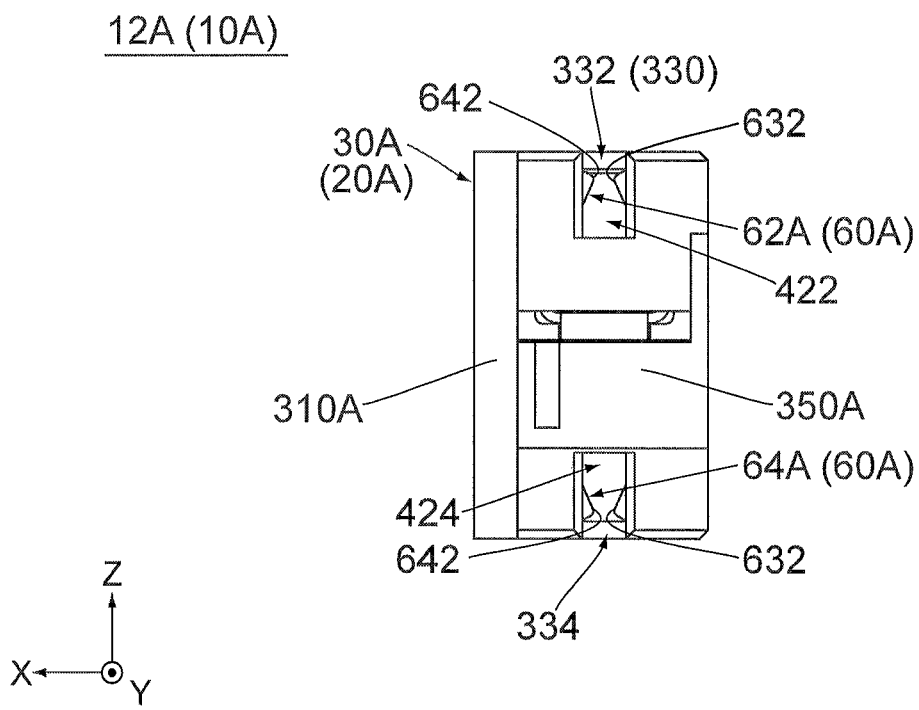
FIG. 34 is a side view showing the connector body of FIG. 32.
Figure 35:
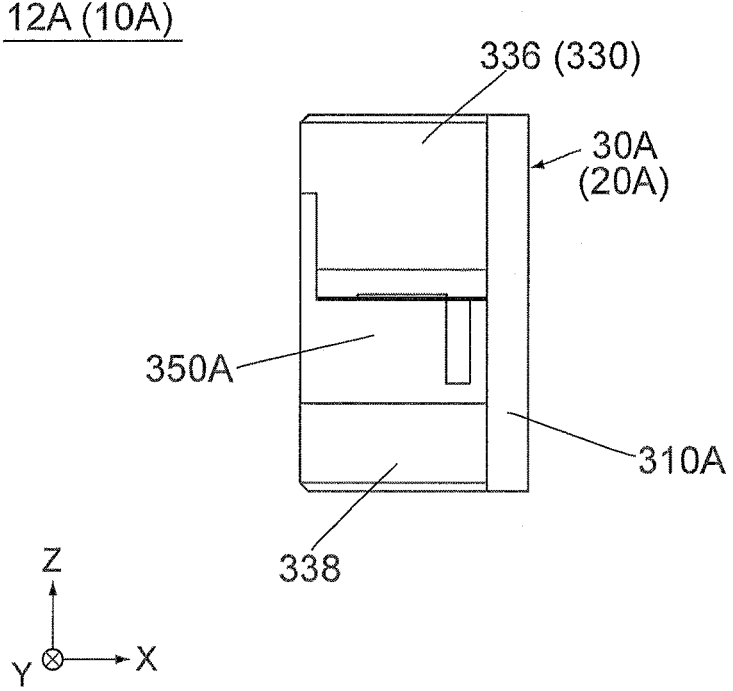
FIG. 35 is another side view showing the connector body of FIG. 32.

Referring to FIGS. 33 to 35 together with FIG. 20, the second member 40A of the housing 20A does not have three portions of the second member 40 of the housing 20, namely the partition portion 440 and the additional holding portions 450. Except for the aforementioned difference, the second member 40A has a structure identical to that of the second member 40 of the housing 20.

Figure 36:
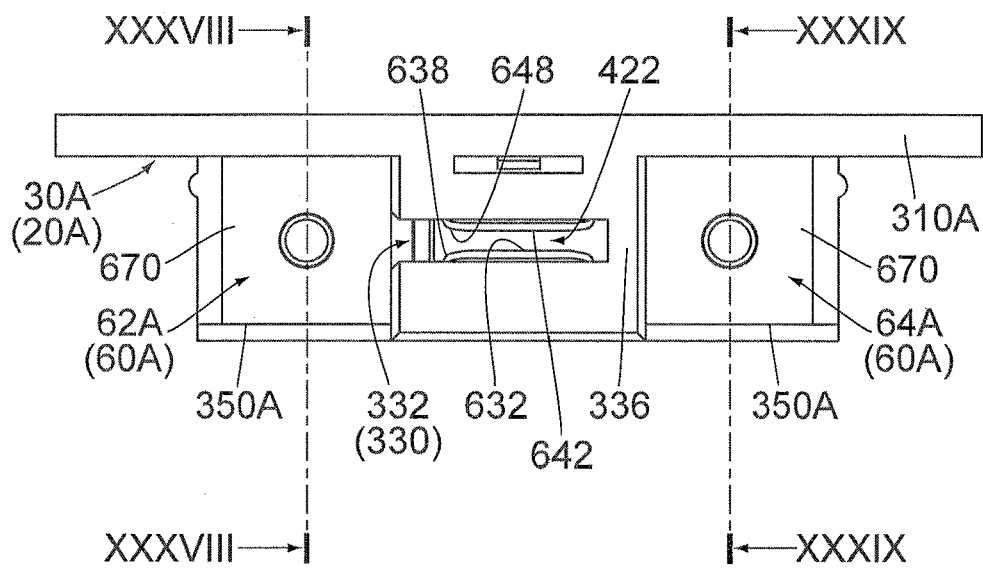
FIG. 36 is a top view showing the connector body of FIG. 32.
Figure 37:
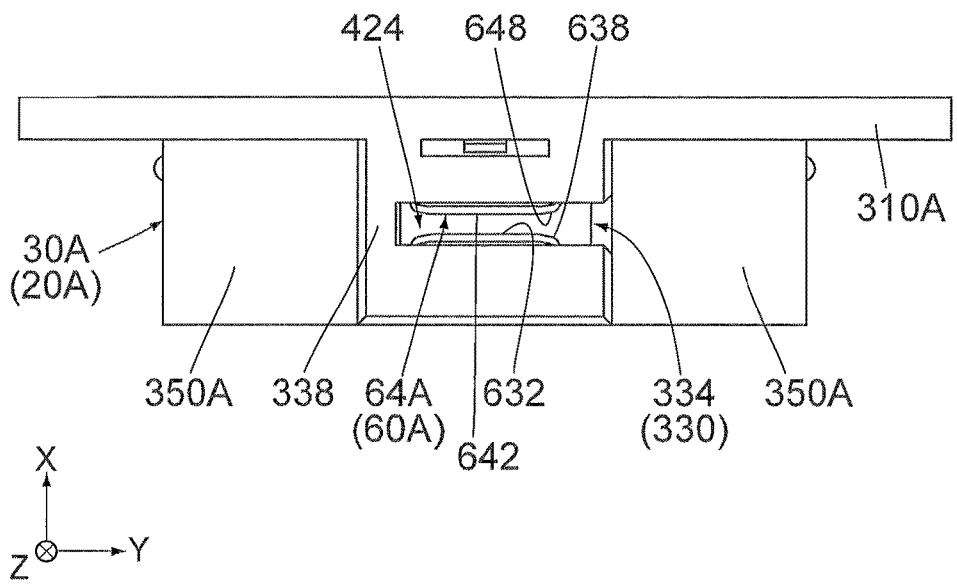
FIG. 37 is a bottom view showing the connector body of FIG. 32.
Figure 38:
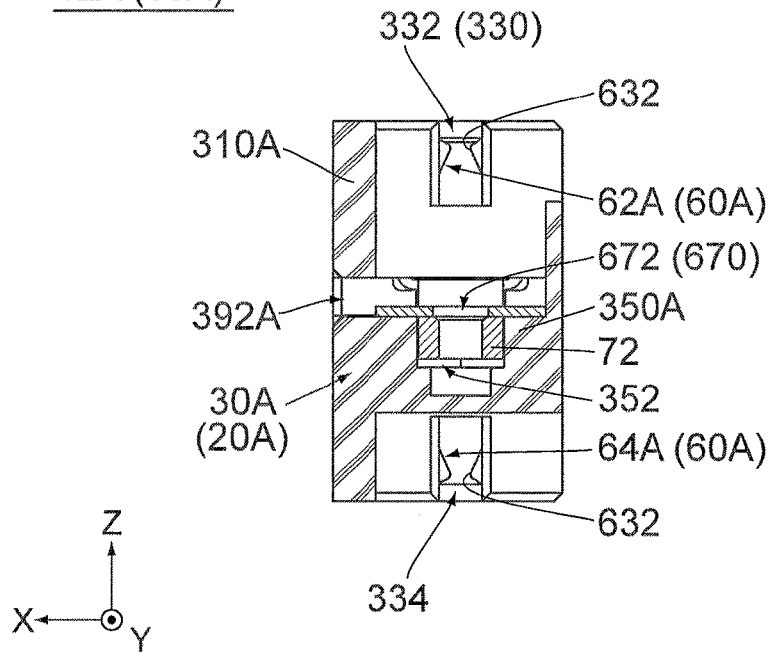
FIG. 38 is a cross-sectional view showing the connector body of FIG. 36, taken along line XXXVIII-XXXVIII.
Figure 39:
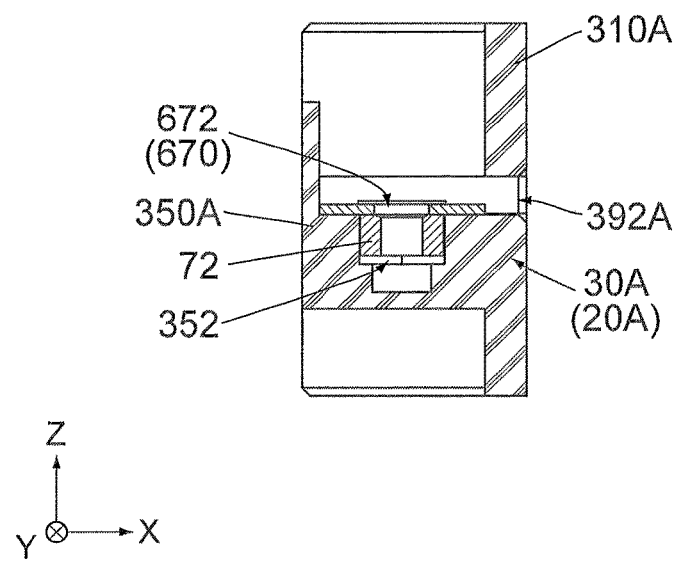
FIG. 39 is a cross-sectional view showing the connector body of FIG. 36, taken along line XXXIX-XXXIX.

Referring to FIG. 36 together with FIG. 21, each of the first contact 62A and the second contact 64A does not have the additional connection portion 680 which is provided to each of the first contact 62 and the second contact 64. Except for the aforementioned difference, the first contact 62A and the second contact 64A have structures identical to those of the first contact 62 and the second contact 64, respectively.

Referring to FIG. 33, the contact holding portion 420 of the second member 40A is inserted into the accommodation portion 380 (see FIG. 19) of the first member 30A similar to the previously described embodiment, so that the connector body 12A is formed.

Referring to FIGS. 34 to 37, the housing 20A of the connector body 12A has the busbar connection portion 330 which has a structure identical to that of the previously described embodiment. Therefore, the connector body 12A is connectable to the first busbar 862 (see FIG. 25) and the second busbar 864 (see FIG. 25) similar to the previously described embodiment.

Figure 40:
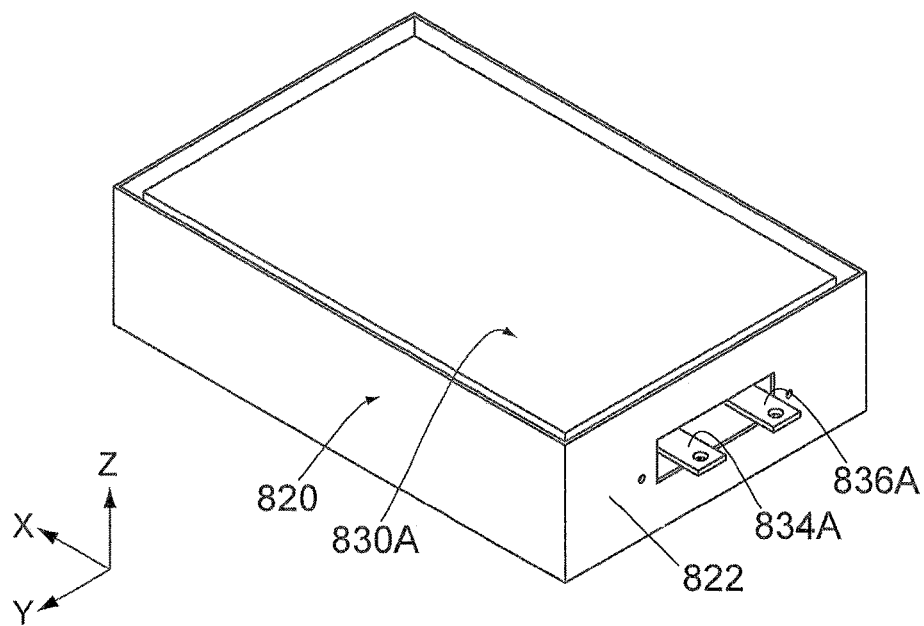
FIG. 40 is a perspective view showing a modification of the battery unit of FIG. 2, wherein the top plate of the case is not illustrated.
Figure 41:
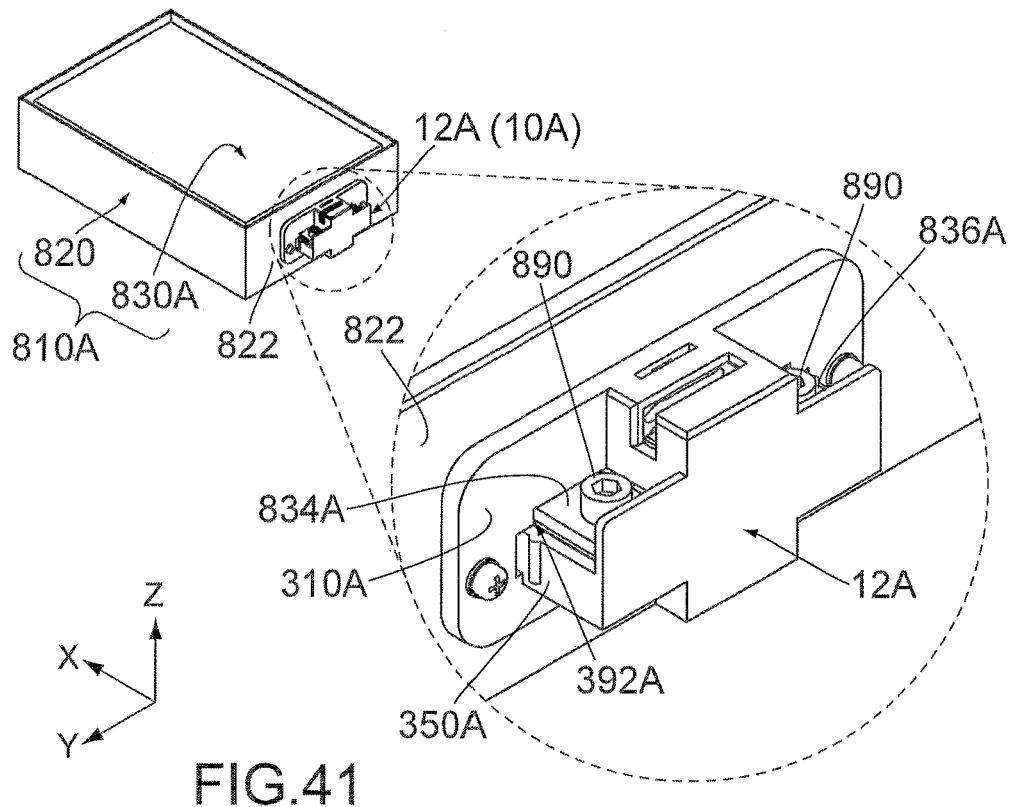
FIG. 41 is a perspective view showing the battery unit of FIG. 40, wherein the connector body of FIG. 32 is attached to the battery unit, the connector body and therearound (part enclosed by dashed line) is enlarged to be illustrated, and the top plate of the case is not illustrated.
Figure 42:
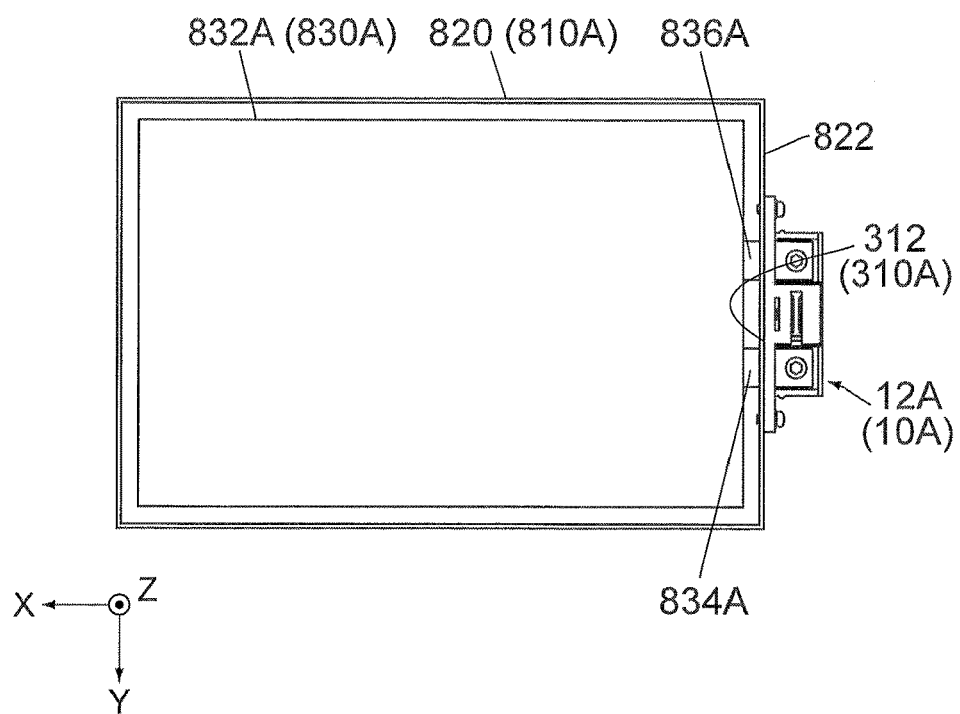
FIG. 42 is a top view showing the battery unit and the connector body of FIG. 41, wherein the top plate of the case is not illustrated.

Referring to FIGS. 41 and 42, in the present modification, the connector body 12A is attached to a battery unit 810A when used. Referring to FIGS. 40 to 42, the battery unit 810A comprises a case 820A with the panel 822 and a battery module 830A. The battery module 830A is accommodated inside the case 820A. The battery module 830A has a body portion 832A and two terminals 834A and 836A. Referring to FIGS. 41 and 42, the attached portion 310A of the connector body 12A is attached and fixed to the panel 822 of the case 820A. The thus-fixed attached surface 312 is in contact with the panel 822.

Figure 43:
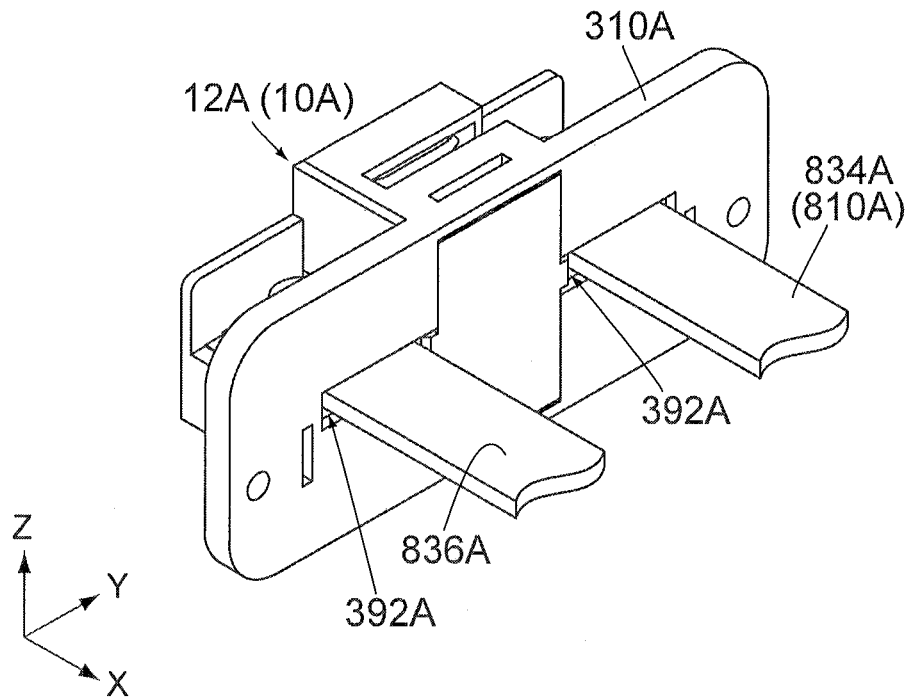
FIG. 43 is a perspective view showing the connector body of FIG. 41, wherein terminals of the battery unit are connected to the connector body.

Referring to FIGS. 41 and 43, the terminals 834A and 836A pass through the passages 392A, respectively, and fixed to the holding portions 350A of the connector body 12A, respectively. In detail, referring to FIGS. 41 and 43 together with 38 and 39, each of the terminals 834A and 836A is fixed to the connection portion 670 of the corresponding contact 60A by the bolt 890 and the nut 72, so that the connector body 12A is electrically connected with the battery module 830A.

The connector body 12 (see FIG. 8) of the previously described embodiment comprises the two additional connection portions 680 (see FIG. 8). Each of the additional connection portions 680 is connectable to the terminal 834 or 836 (additional connection member) other than the busbar 860 and the cable 880 (connection member). In contrast, the connector body 12A according to the present modification does not comprise the additional connection portions 680, but the connection portions 670 work as the additional connection portions 680. Each of the connection portions 670 is also connectable to the cable 880 (see FIG. 30) similar to the previously described embodiment.

The connector body 12A according to the present modification has no projecting portion that projects inside the case 820 beyond the attached portion 310A along the sixth orientation (positive X-direction). Therefore, the connector body 12A can be reduced in size in the second perpendicular direction (X-direction), and the battery unit 810A can be reduced in size. Moreover, a size of the body portion 832A of the battery module 830A in the second perpendicular direction can be made larger while a size of the case 820 of the battery unit 810A in the second perpendicular direction is unchanged, so that a battery capacity of the body portion 832A can be made larger.

Second Embodiment

Figure 44:
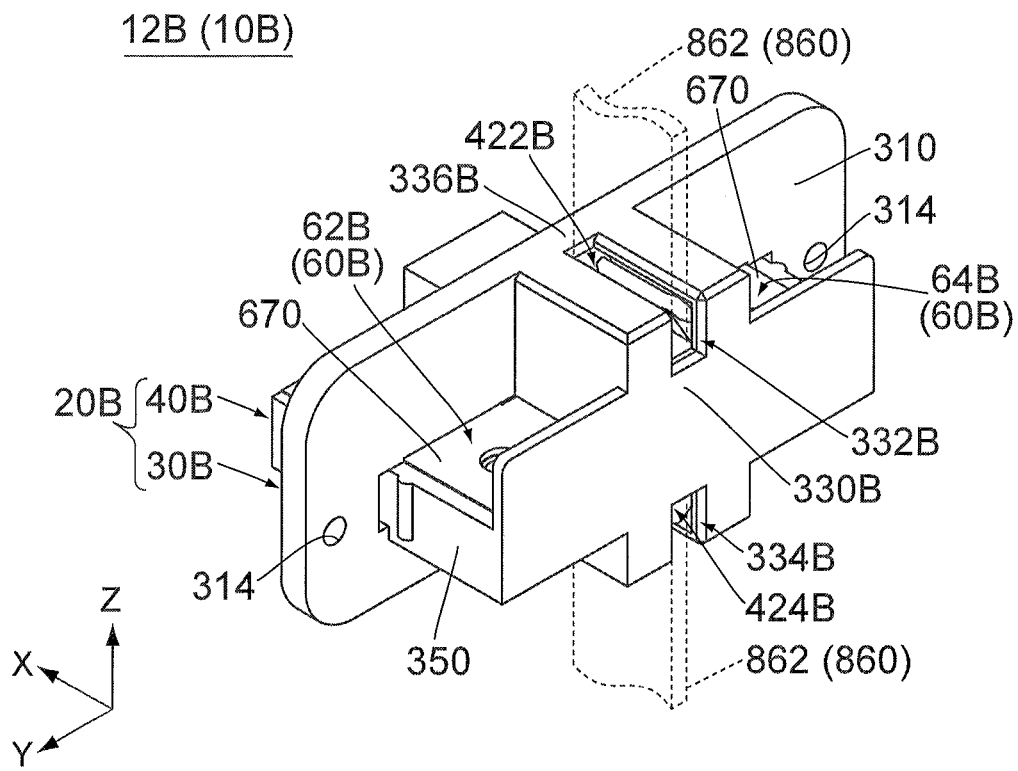
FIG. 44 is a perspective view showing a connector body of a connector according to a second embodiment of the present invention, wherein outlines of the busbars connected to the connector body are illustrated in dashed line.

Referring to FIG. 44, a connector 10B according to a second embodiment of the present invention is used in the power storage device 80 (see FIG. 1) similar to the connector 10 (see FIG. 1). The connector 10B is attachable to the panel 822 (see FIG. 3) and connectable to the two busbars 860, namely the first busbar 862 and the second busbar 864. However, the present invention is not limited thereto, but the connector 10B can be used for connection of various devices.

In the present embodiment, similar to the first embodiment, the Z-direction is the predetermined direction, or the connection direction along which two of the connectors 10B are connected with each other via the busbar 860. The negative Z-direction and the positive Z-direction are the first orientation and the second orientation, respectively. However, different from the first embodiment, the X-direction is the perpendicular direction that is the insertion direction and the removal direction of the busbar 860 into and from the connector 10B, and the Y-direction is the second perpendicular direction. According to this embodiment, the positive X-direction, the negative X-direction, the positive Y-direction and the negative Y-direction are the third orientation, the fourth orientation, the fifth orientation and the sixth direction, respectively.

Figure 45:
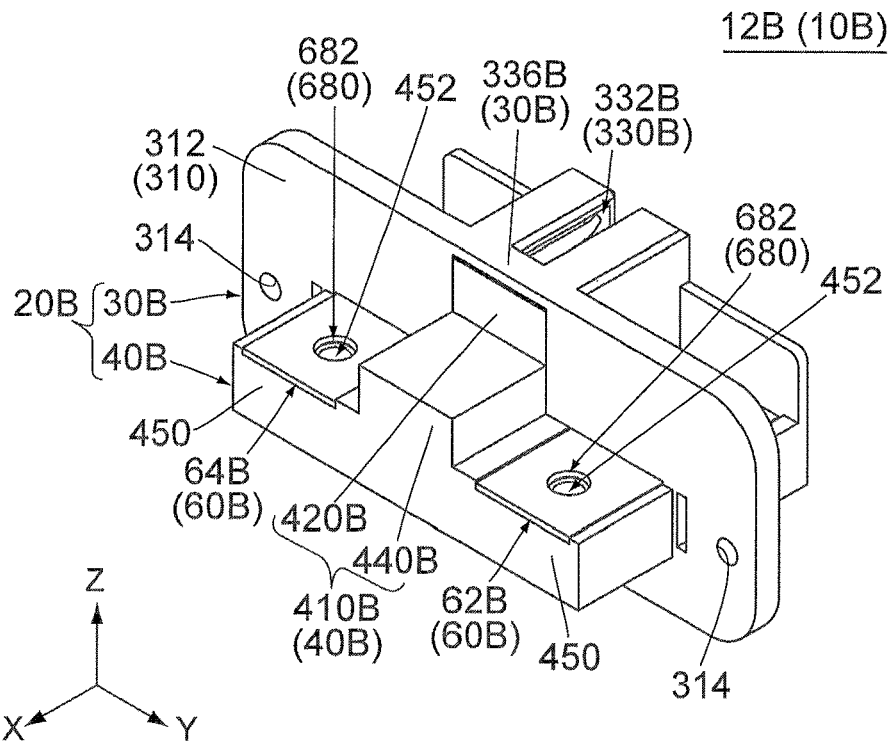
FIG. 45 is another perspective view showing the connector body of FIG. 44.
Figure 55:
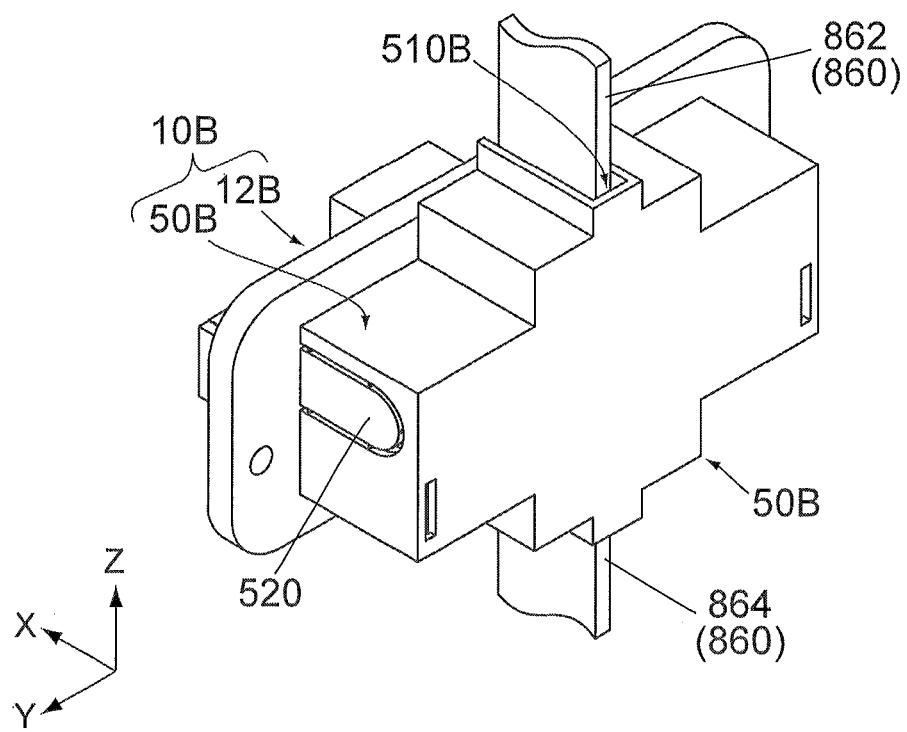
FIG. 55 is a perspective view showing the connector body and the busbars of FIG. 54, wherein a cover is attached to the connector body.

Referring to FIGS. 44, 45 and 55, the connector 10B of the present embodiment is formed by combining members similar to those of the connector 10 (see FIGS. 4, 7 and 8) according to the first embodiment and has a structure similar to that of the connector 10. Hereafter, explanation is mainly made about difference between the connector 10B and the connector 10.

Referring to FIG. 55, the connector 10B comprises a connector body 12B and a cover 50B made of insulator. Referring to FIGS. 44 and 45 together with FIG. 6, the connector body 12B comprises a housing 20B made of insulator, two contacts 60B each made of metal, namely a first contact 62B and a second contact 64B, the two nuts 72 and the two additional nuts 74. The housing 20B comprises a first member 30B and a second member 40B. The first member 30B and the second member 40B are combined with each other similar to the first embodiment, so that the connector body 12B is formed.

As shown in FIGS. 44 and 46 to 49, the first member 30B of the housing 20B has the attached portion 310 and the two holding portions 350 same as those of the first embodiment while having a busbar connection portion 330B different from that of the first embodiment. The attached portion 310 is attachable to the panel 822 (see FIG. 3) and extends along the second perpendicular plane (YZ-plane) perpendicular to the perpendicular direction (X-direction). The attached surface 312 of the attached portion 310 is located in the second perpendicular plane. Each of the attachment holes 314 of the attached portion 310 passes through the attached portion 310 in the perpendicular direction. The busbar connection portion 330B and the holding portions 350 project from the attached portion 310 along the fourth orientation (negative X-direction). The busbar connection portion 330B is located at the middle of the attached portion 310 in the second perpendicular direction (Y-direction). The holding portions 350 are located at opposite sides of the busbar connection portion 330B in the second perpendicular direction, respectively.

Referring to FIGS. 44 to 48, the busbar connection portion 330B is formed with a first opening 332B and a second opening 334B. The first opening 332B and the second opening 334B are located at opposite end portions of the busbar connection portion 330B in the predetermined direction (Z-direction), respectively. The first opening 332B opens outward in the second orientation (positive Z-direction) and opens outward in the fourth orientation (negative X-direction). The second opening 334B opens outward in the first orientation (negative Z-direction) and opens outward in the fourth orientation.

Figure 46:
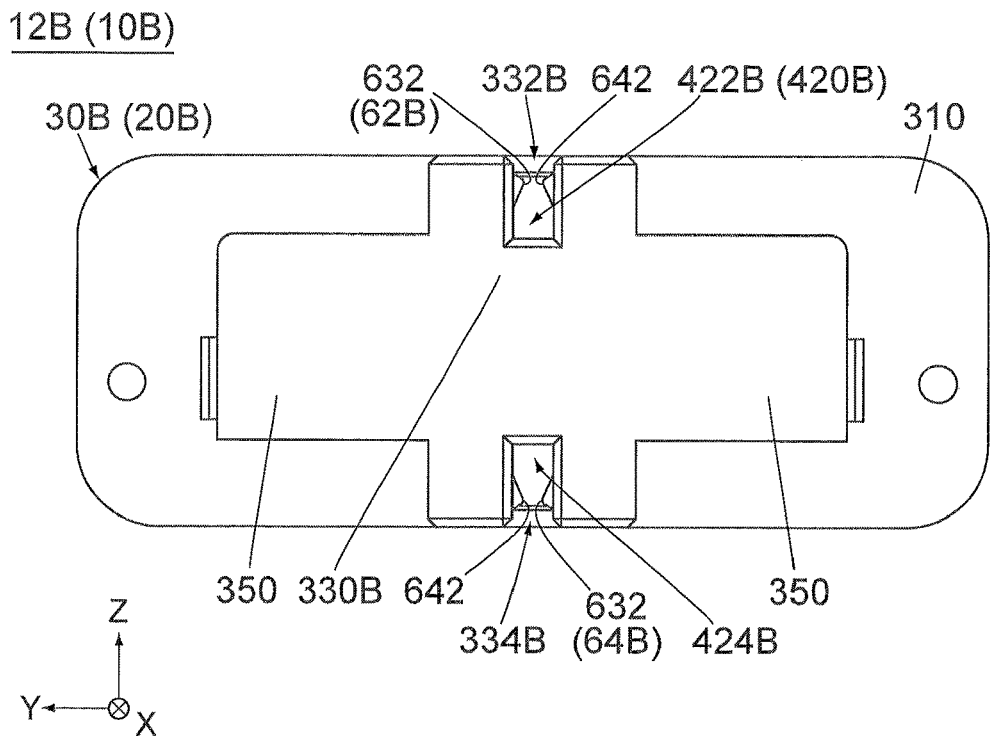
FIG. 46 is a front view showing the connector body of FIG. 44.
Figure 47:
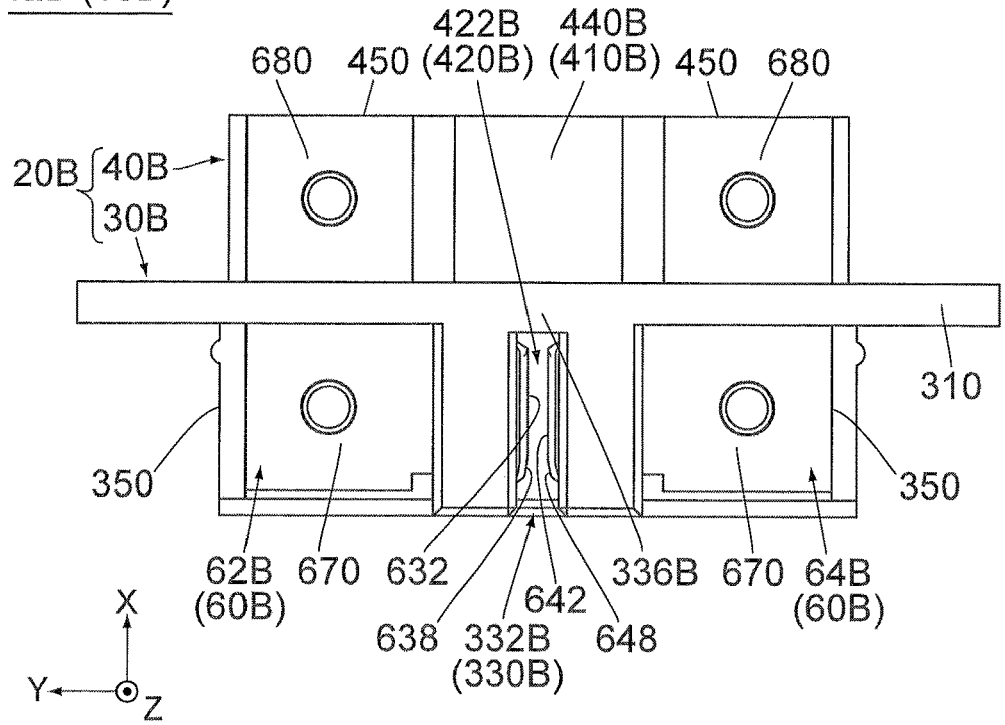
FIG. 47 is a top view showing the connector body of FIG. 44.
Figure 48:
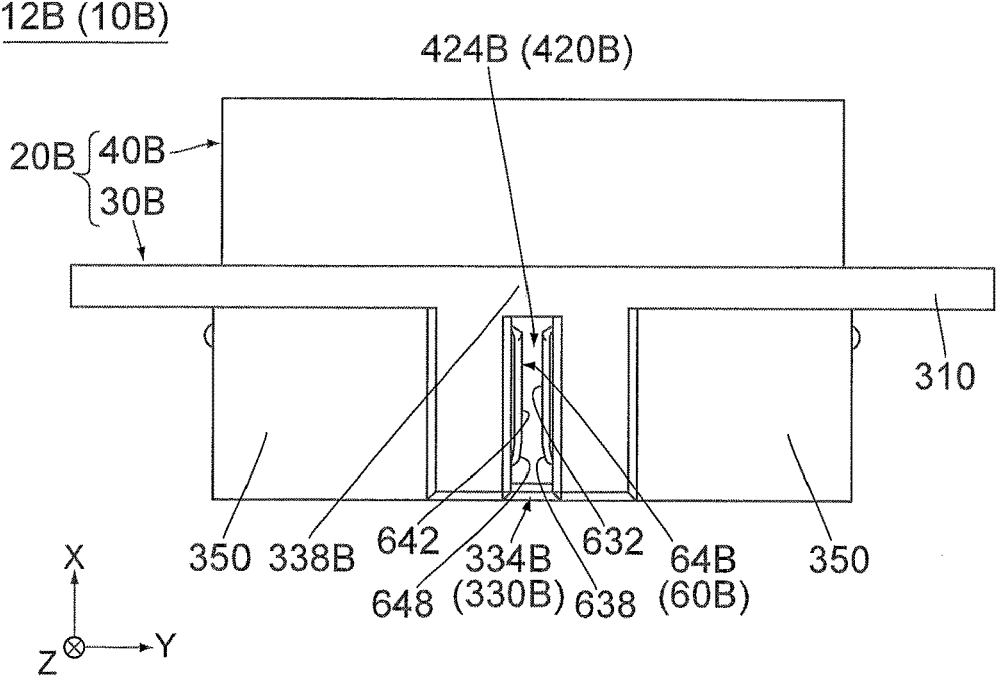
FIG. 48 is a bottom view showing the connector body of FIG. 44.

Referring to FIGS. 46 and 47, the first opening 332B is visible when the housing 20B is seen along the first orientation (negative Z-direction) in the predetermined direction (Z-direction) and is visible when the housing 20B is seen along the third orientation (positive X-direction) in the perpendicular direction (X-direction) perpendicular to the predetermined direction. Referring to FIGS. 46 and 48, the second opening 334B is visible when the housing 20B is seen along the second orientation (positive Z-direction) opposite to the first orientation and is visible when the housing 20B is seen along the third orientation.

Referring to FIGS. 44, 45, 47, 48 and 49, the busbar connection portion 330B has a first protection portion 336B and a second protection portion 338B. Each of the first protection portion 336B and the second protection portion 338B is a part of the attached portion 310. In the perpendicular direction (X-direction), the first protection portion 336B blocks an end of the first opening 332B in the third orientation (positive X-direction). In the perpendicular direction, the second protection portion 338B blocks an end of the second opening 334B in the third orientation.

Figure 49:
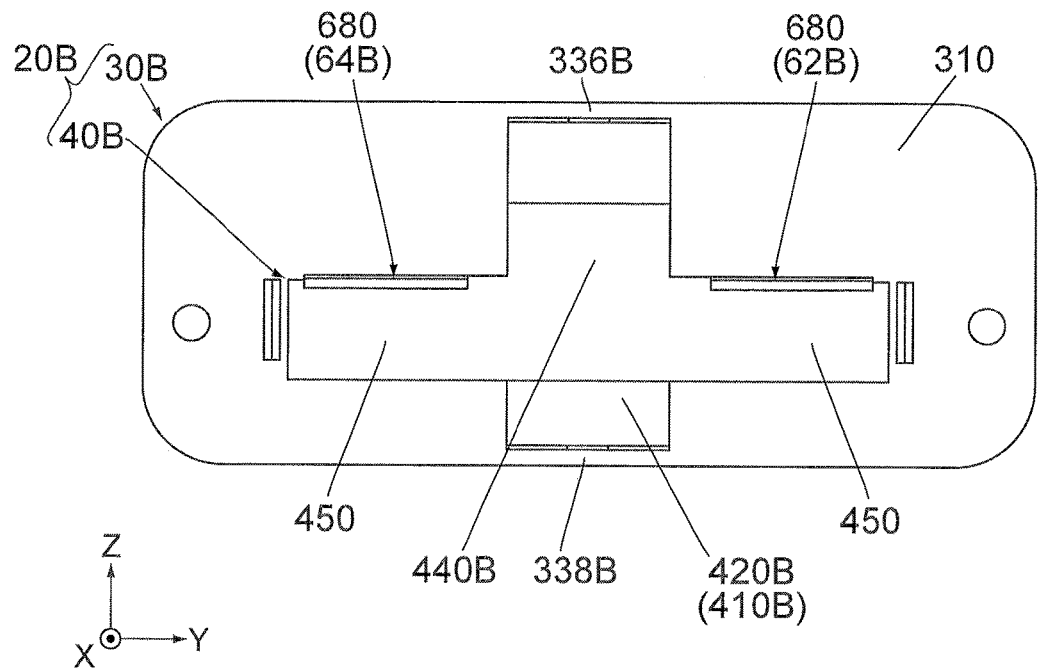
FIG. 49 is a rear view showing the connector body of FIG. 44.

As shown in FIGS. 45, 47 and 49, the second member 40B of the housing 20B has the two additional holding portions 450 same as those of the first embodiment and has a base portion 410B different from that of the first embodiment. The base portion 410B is located at the middle of the second member 40B in the second perpendicular direction (Y-direction). The base portion 410B has a contact holding portion 420B and a partition portion 440B. The partition portion 440B projects from the contact holding portion 420B along the third orientation (positive X-direction). The additional holding portions 450 are located at opposite sides of the partition portion 440B in the second perpendicular direction, respectively.

Referring to FIG. 45, the contact holding portion 420B is inserted into the accommodation portion 380 (see FIG. 19) of the first member 30B similar to the first embodiment. Referring to FIGS. 46 to 48, the thus-assembled housing 20B is formed with a first receiving portion 422B and a second receiving portion 424B.

Referring to FIGS. 44 and 55, the cover 50B has a shape corresponding to a projecting portion of the first member 30B of the housing 20B, or a portion that projects from the attached portion 310 along the fourth orientation (negative X-direction). The cover 50B has a space formed therewithin which has a shape corresponding to the projecting portion. Referring to FIG. 55, the cover 50B is provided with two busbar passages 510B and the two removable walls 520. The removable walls 520 are located at opposite end portions of the cover 50B in the second perpendicular direction (Y-direction), respectively.

Figure 50:
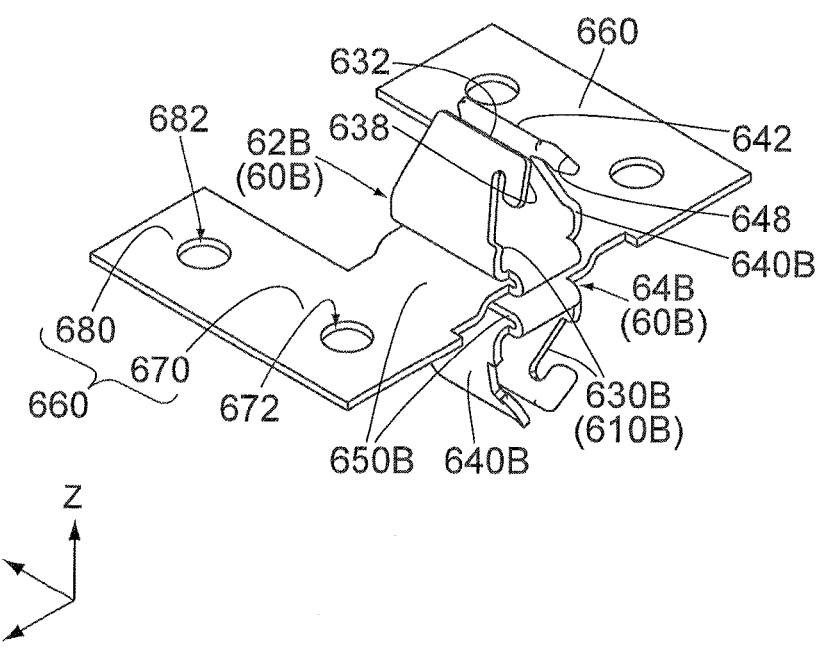
FIG. 50 is a perspective view showing two contacts of the connector body of FIG. 44.
Figure 51:
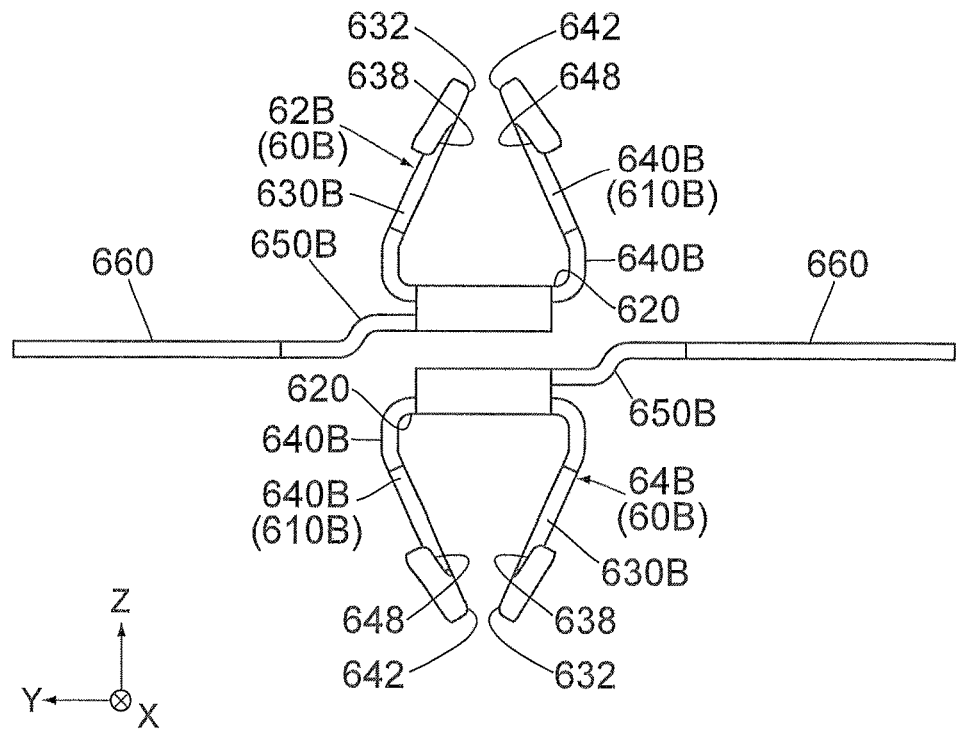
FIG. 51 is a front view showing the two contacts of FIG. 50.

Referring to FIGS. 50 and 51, in the present embodiment, each of the first contact 62B and the second contact 64B is a single metal plate with bends. Hereafter, explanation is made about a structure of the first contact 62B.

As shown in FIGS. 50 and 51, the first contact 62B has the sub-portion 660 same as that of the first embodiment while having a main portion 610B and a coupling portion 650B different from those of the first embodiment. The main portion 610B has a triangular shape when the first contact 62B is seen along the third orientation (positive X-direction). The coupling portion 650B extends with bends and couples the main portion 610B and the sub-portion 660 to each other so that the main portion 610B and the sub-portion 660 are arranged in the second perpendicular direction (Y-direction).

As shown in FIG. 51, the main portion 610B has the held portion 620, a spring portion 630B and an additional spring portion (spring portion) 640B. The spring portion 630B and the additional spring portion 640B extend from opposite ends of the held portion 620 in the second perpendicular direction (Y-direction), respectively, and extend along the second orientation (positive Z-direction) while approaching each other in the second perpendicular direction. Each of the spring portion 630B and the additional spring portion 640B is supported by the held portion 620 as a cantilever to be resiliently deformable. The spring portion 630B has the contact portion 632, and the additional spring portion 640B has the catch portion 642. The contact portion 632 is movable in the second perpendicular direction according to resilient deformation of the spring portion 630B. The catch portion 642 is movable in the second perpendicular direction according to resilient deformation of the additional spring portion 640B.

Figure 52:
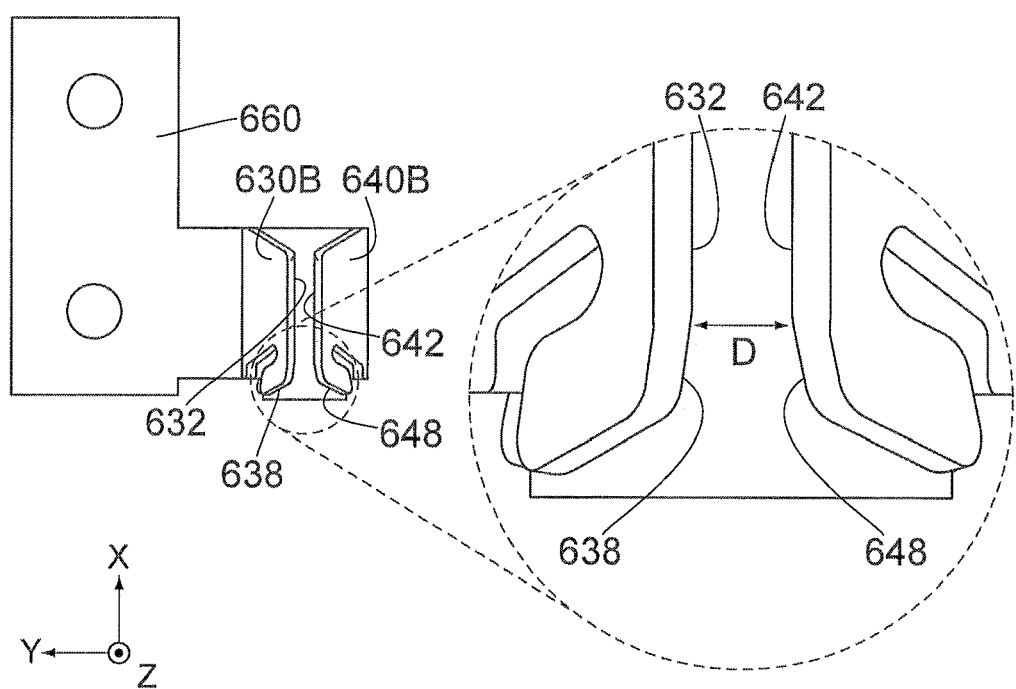
FIG. 52 is a top view showing a first contact of the two contacts of FIG. 50, wherein a part of the contact (part enclosed by dashed line) is enlarged to be illustrated.

As shown in FIGS. 51 and 52, the spring portion 630B is provided with the guide portion 638, and the additional spring portion 640B is provided with the guide portion 648. The guide portion 638 is an edge of a projecting portion which projects from the contact portion 632 of the spring portion 630B along the fourth orientation (negative X-direction). The guide portion 648 is an edge of a projecting portion which projects from the catch portion 642 of the additional spring portion 640B along the fourth orientation. Referring to FIG. 52, a distance D between the guide portion 638 and the guide portion 648 in the second perpendicular direction (Y-direction) gradually decreases along the third orientation (positive X-direction).

Referring to FIG. 50, the connection portion 670 is one of opposite sides of the sub-portion 660 in the perpendicular direction (X-direction) and is adjacent to the main portion 610B in the second perpendicular direction (Y-direction). The additional connection portion 680 is a remaining one of the opposite sides of the sub-portion 660 in the perpendicular direction and projects from the connection portion 670 along the third orientation (positive X-direction). The connection portion 670 is formed with an attachment hole 672. The attachment hole 672 passes through the connection portion 670 in the predetermined direction (Z-direction). The additional connection portion 680 is formed with an additional attachment hole 682. The additional attachment hole 682 passes through the additional connection portion 680 in the predetermined direction.

Referring to FIGS. 50 and 51, the second contact 64B has a shape and a size identical to those of the first contact 62B. However, the second contact 64B is arranged to take a posture obtained by rotating a posture of the first contact 62B by 180 degrees about the X-axis. The held portions 620 of the first contact 62B and the second contact 64B are arranged in the predetermined direction (Z-direction). The spring portion 630B and the additional spring portion 640B of the second contact 64B extend from opposite ends of the held portion 620 in the second perpendicular direction (Y-direction), respectively, and extend along the first orientation (negative Z-direction) while approaching each other in the second perpendicular direction. The second contact 64B has a structure identical to that of the first contact 62B except the aforementioned difference.

Referring to FIG. 51, according to the present embodiment, in each of the first contact 62B and the second contact 64B, the spring portion 630B and the additional spring portion 640B have a mirror-symmetric shape with respect to a predetermined plane (XZ-plane). In each of the contacts 60B, the contact portion 632 is supported by the spring portion 630B so as to be movable in the second perpendicular direction (Y-direction), and the catch portion 642 is supported by the additional spring portion 640B so as to be movable in the second perpendicular direction.

Referring to FIGS. 44 and 45, each of the contacts 60B is held by the housing 20B. Referring to FIGS. 46 and 47, the contact portion 632 and the catch portion 642 of the first contact 62B are located inside the first receiving portion 422B of the housing 20B. Referring to FIGS. 46 and 48, the contact portion 632 and the catch portion 642 of the second contact 64B are located inside the second receiving portion 424B of the housing 20B.

Figure 53:
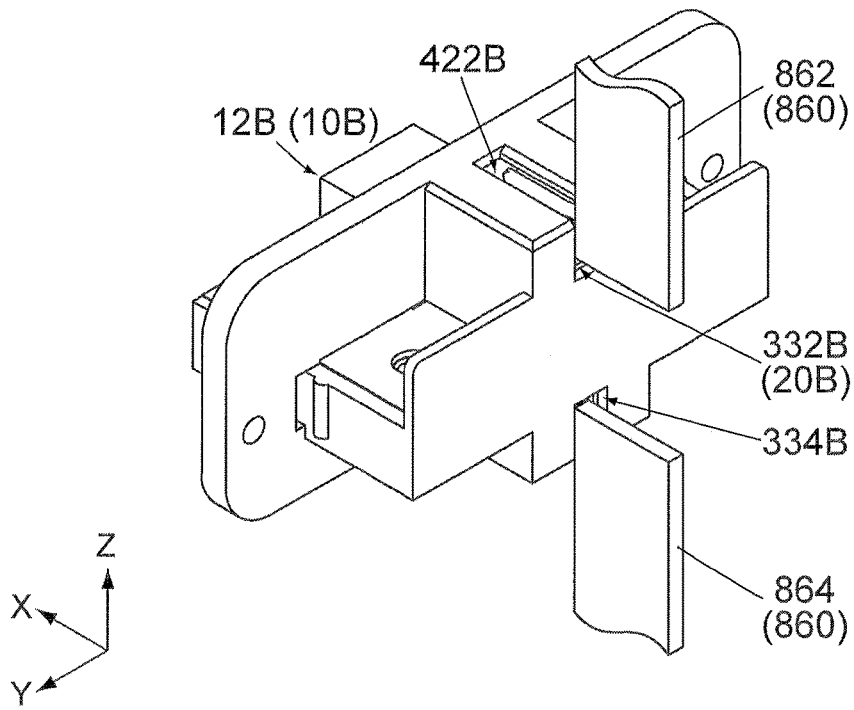
FIG. 53 is a perspective view showing the connector body of FIG. 44 together with the two busbars, wherein each of the busbars is under a state where connection to the connector body starts.

Referring to FIG. 53, the connector body 12B is connectable to the first busbar 862 and the second busbar 864 same as those of the first embodiment. Referring to FIG. 53 together with FIG. 46, the end of the first busbar 862 is inserted into the first receiving portion 422B through the first opening 332B along the third orientation (positive X-direction), and the end of the second busbar 864 is inserted into the second receiving portion 424B through the second opening 334B along the third orientation. The first receiving portion 422B partially receives the first busbar 862 when the first busbar 862 is inserted through the first opening 332B. The second receiving portion 424B partially receives the second busbar 864 when the second busbar 864 is inserted through the second opening 334B.

As shown in FIGS. 46 and 47, the contact portion 632 and the catch portion 642 of the first contact 62B are visible through the first opening 332B both when the housing 20B is seen along the first orientation (negative Z-direction) and when the housing 20B is seen along the third orientation (positive X-direction). As shown in FIGS. 46 and 48, the contact portion 632 and the catch portion 642 of the second contact 64B are visible through the second opening 334B both when the housing 20B is seen along the second orientation (positive Z-direction) and when the housing 20B is seen along the third orientation.

Figure 54:
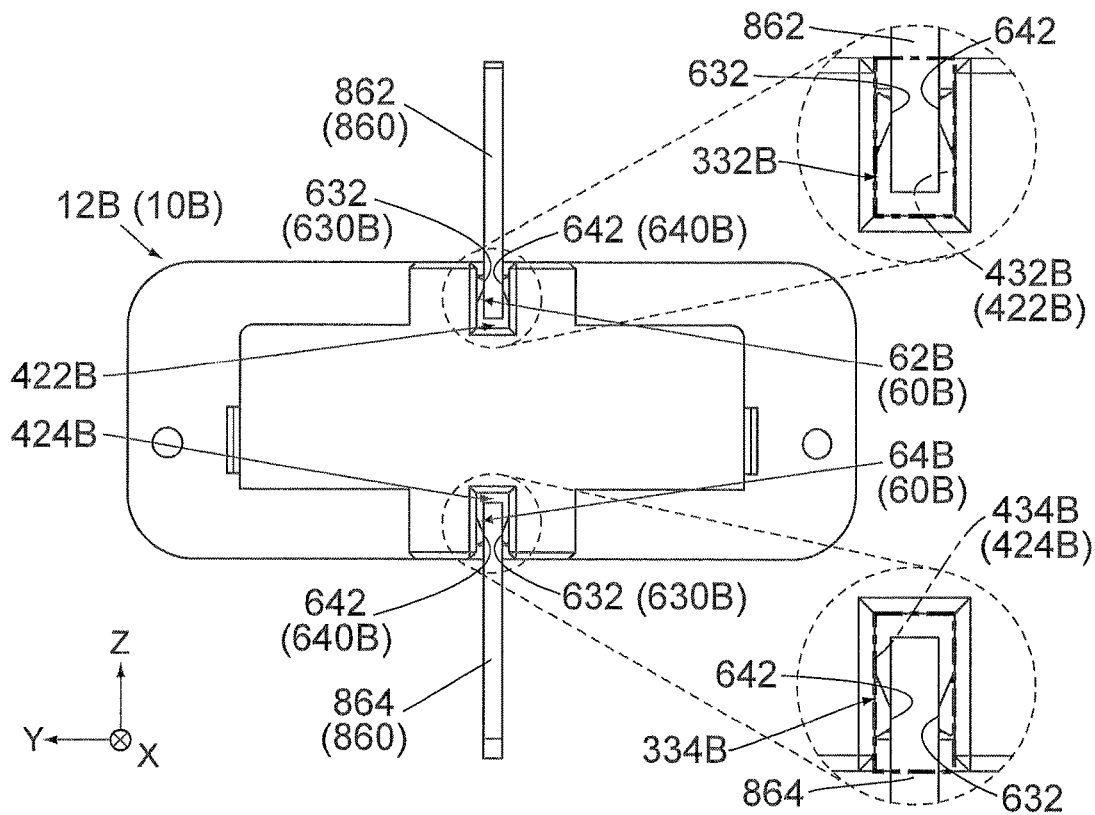
FIG. 54 is a front view showing the connector body and the busbars of FIG. 53, wherein each of the busbars is connected to the connector body, first and second openings and therearound (parts each enclosed by dashed line) are enlarged to be illustrated, and boundaries of first and second connection spaces in the enlarged views are illustrated in chain dotted line.

In detail, referring to FIG. 54, the contact portion 632 and the catch portion 642 of the first contact 62B are located inside a first connection space 432B which is a part of the first receiving portion 422B. The first opening 332B defines a boundary (see chain dotted line in FIG. 54) of the first connection space 432B in the second perpendicular plane (YZ-plane) and defines another boundary of the first connection space 432B in a perpendicular plane (XY-plane). The contact portion 632 and the catch portion 642 of the second contact 64B are located inside a second connection space 434B which is a part of the second receiving portion 424B. The second opening 334B defines a boundary (see chain dotted line in FIG. 54) of the second connection space 434B in the second perpendicular plane and defines another boundary of the second connection space 434B in the perpendicular plane.

As shown in FIG. 54, the contact portion 632 and the catch portion 642 of the first contact 62B, which are arranged as described above, are brought into contact with the first busbar 862 when the first busbar 862 is partially received in the first connection space 432B of the first receiving portion 422B. Similarly, the contact portion 632 and the catch portion 642 of the second contact 64B, which are arranged as described above, are brought into contact with the second busbar 864 when the second busbar 864 is partially received in the second connection space 434B of the second receiving portion 424B. As a result, the connector body 12B is electrically connected with each of the first busbar 862 and the second busbar 864. As can be seen from FIGS. 1 and 54, the connector 10B according to the present embodiment is connectable with the other connector 10B via the busbar 860 of a simple shape similar to the first embodiment.

Referring to FIGS. 47 to 49, the first protection portion 336B of the housing 20B hides the first opening 332B when the housing 20B is seen along the fourth orientation (negative X-direction) opposite to the third orientation (positive X-direction). The second protection portion 338B of the housing 20B hides the second opening 334B when the housing 20B is seen along the fourth orientation. Similar to the first embodiment, the first protection portion 336B stops the movement of the first busbar 862 (see FIG. 53) along the third orientation, and the second protection portion 338B stops the movement of the second busbar 864 (see FIG. 53) along the third orientation.

Referring to FIGS. 47 and 48, each of the contact portion 632 and the catch portion 642 in each of the contacts 60B is located between the connection portions 670 of the two contacts 60B in the second perpendicular direction (Y-direction). Referring to FIG. 46, the contact portions 632 of the two contacts 60B are arranged in the predetermined direction (Z-direction), and the catch portions 642 of the two contacts 60B are arranged in the predetermined direction. When the first busbar 862 (see FIG. 53) is inserted, the contact portion 632 and the catch portion 642 of the first contact 62B equivalently apply spring forces to the first busbar 862 which is partially received in the first receiving portion 422B and hold the first busbar 862 therebetween. Similarly, when the second busbar 864 (see FIG. 53) is inserted, the contact portion 632 and the catch portion 642 of the second contact 64B equivalently apply spring forces to the second busbar 864 which is partially received in the second receiving portion 424B and hold the second busbar 864 therebetween. This holding mechanism securely connects each of the contacts 60B to the busbar 860.

Referring to FIGS. 47 and 51, the guide portions 638 and 648 of the first contact 62B guide the first busbar 862 (see FIG. 53) when the first busbar 862 is inserted through the first opening 332B. Referring to FIGS. 48 and 51, the guide portions 638 and 648 of the second contact 64B guide the second busbar 864 (see FIG. 53) when the second busbar 864 is inserted through the second opening 334B. According to the present embodiment, since the guide portions 638 and 648 are provided, each of the busbars 860 (see FIG. 53) can be smoothly inserted.

As shown in FIGS. 46 and 47, a part of the first opening 332B extends in the predetermined direction (Z-direction), and a remaining part of the first opening 332B extends in the perpendicular direction (X-direction). Thus, the first opening 332B extends along the predetermined plane (XZ-plane) defined by the predetermined direction and the perpendicular direction. As shown in FIGS. 46 and 48, a part of the second opening 334B extends in the predetermined direction, and a remaining part of the second opening 334B extends in the perpendicular direction. Thus, the second opening 334B extends along the predetermined plane.

Referring to FIGS. 46 to 48, the first opening 332B and the second opening 334B extend in a common plane. In addition, the first opening 332B and the second opening 334B are located at positions same as each other in the perpendicular direction (X-direction). According to the present embodiment, similar to the first embodiment, the busbar 860 can be easily inserted into the first opening 332B and the second opening 334B of two of the connectors 10B that are adjacent to each other in the predetermined direction (Z-direction).

Referring to FIG. 55, after the two busbars 860 are connected to the connector body 12B, the cover 50B is attached to the connector body 12B. As can be seen from FIGS. 44 and 55, the cover 50B hides, at least in part, each of the first opening 332B and the second opening 334B when the connector 10B is seen along the third orientation (positive X-direction). The thus-attached cover 50B prevents the busbar 860 from coming off.

Figure 56:
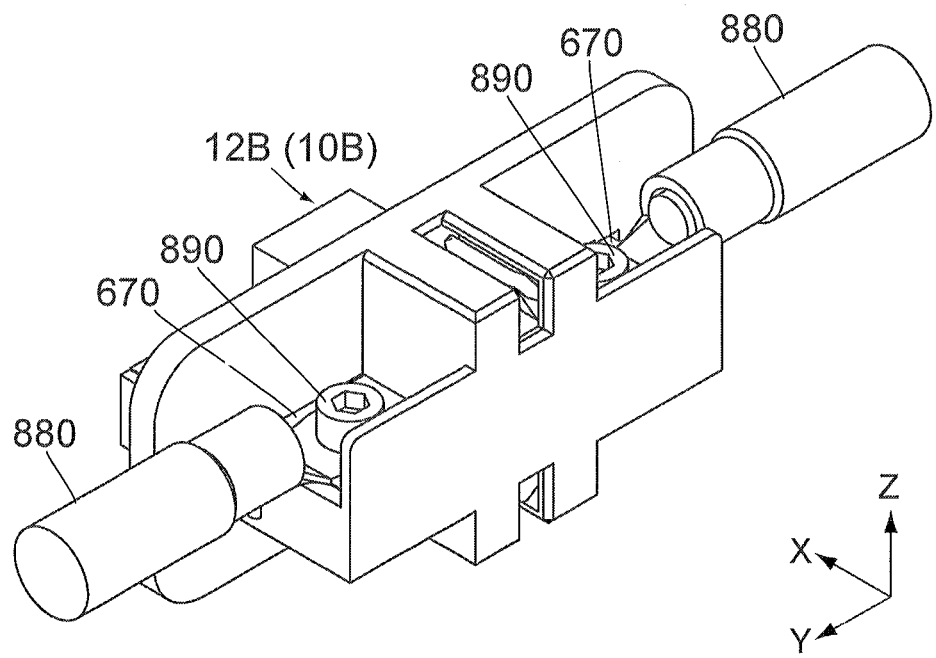
FIG. 56 is a perspective view showing the connector body of FIG. 44 together with the two cables, wherein each of the cables is connected to the connector body.

Referring to FIGS. 44 and 56, each of the connection portions 670 is connectable to the cable 880 (connection member) other than the busbar 860. Referring to FIG. 45 together with FIG. 3, each of the additional connection portions 680 is connectable to the terminal 834 or 836 (additional connection member) other than the busbar 860 (see FIG. 44) and the cable 880 (see FIG. 56).

Figure 57:
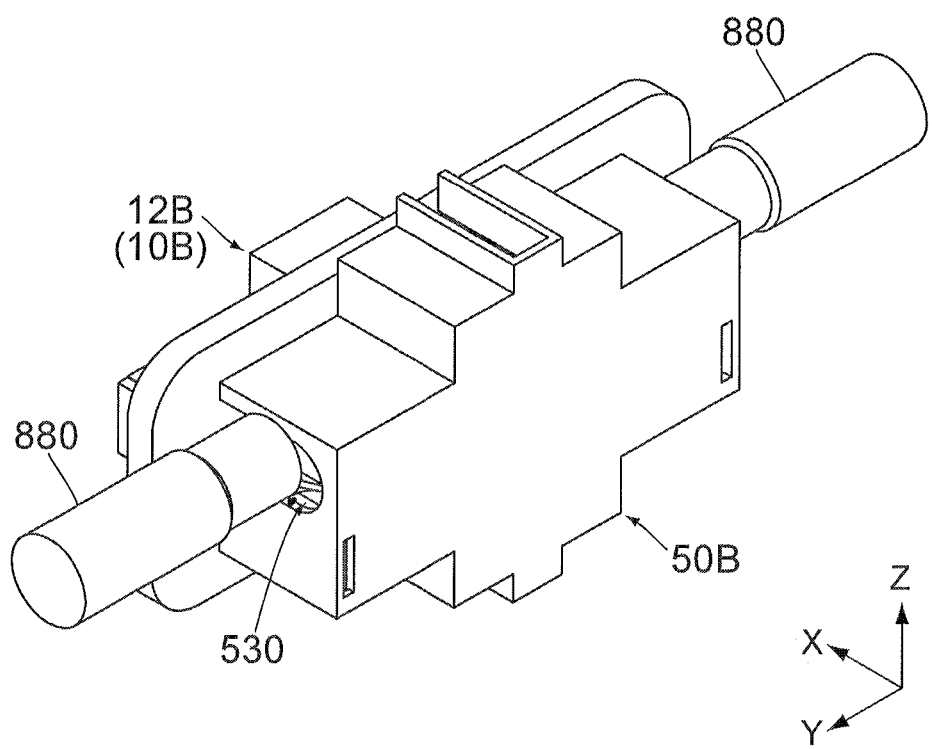
FIG. 57 is a perspective view showing the connector body and the cables of FIG. 56, wherein the cover is attached to the connector body.
Figure 58:
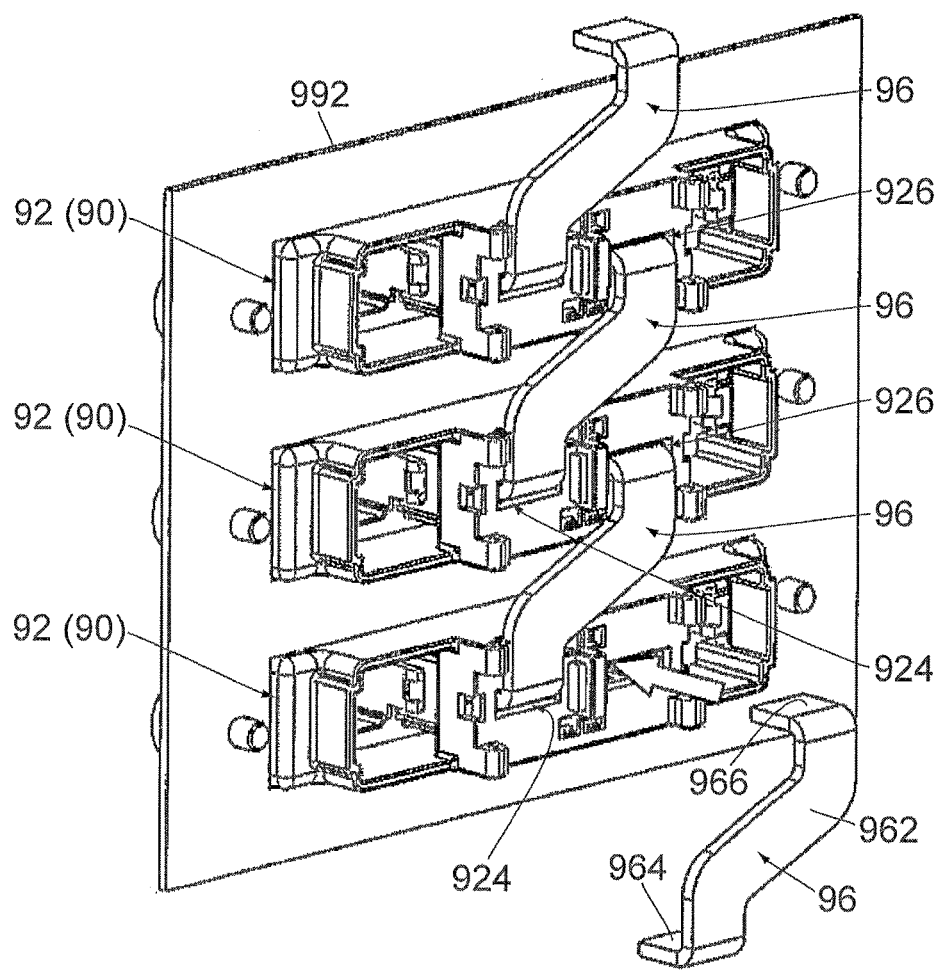
FIG. 58 is perspective view showing a part of a power storage device of Patent Document 1.

Referring to FIG. 56, the two connection portions 670 of the connector body 12B may be connected to the two cables 880, respectively. Referring to FIG. 57, after the cables 880 are connected to the connector body 12B, the cover 50B is formed with the cable passages 530 by removing the removable walls 520 (see FIG. 55) and is attached to the connector body 12B. The cables 880 pass through the thus-formed cable passages 530 to extend outward of the connector 10B, respectively.

The present embodiment can be variously modified similar to the first embodiment. For example, referring to FIG. 45, the connector body 12B does not need to comprise the projecting portion which consists of the partition portion 440B, the additional holding portions 450 and the additional connection portions 680 and which projects from the attached portion 310 along the third orientation (positive X-direction). Referring to FIG. 44, the arrangement of the first opening 332B and the second opening 334B can be variously modified. For example, the position of the first opening 332B in the perpendicular direction (X-direction) may be different from the position of the second opening 334B in the perpendicular direction to some extent. The position of the first opening 332B in the second perpendicular direction (Y-direction) may be different from the position of the second opening 334B in the second perpendicular direction to some extent. The first opening 332B and the second opening 334B may extend along a plane that is in parallel to the predetermined direction (Z-direction) and oblique to the second perpendicular direction to some extent.

The aforementioned embodiments and modifications can be variously combined. Moreover, the aforementioned embodiments can be further variously modified.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector connectable to two busbars of a first busbar and a second busbar, wherein:
   the connector comprises a housing and two contacts of a first contact and a second contact;
   the housing is formed with a first opening, a first receiving portion, a second opening and a second receiving portion;
   the first opening is visible when the housing is seen along a first orientation in a predetermined direction and is visible when the housing is seen along a third orientation in a perpendicular direction perpendicular to the predetermined direction;
   the second opening is visible when the housing is seen along a second orientation opposite to the first orientation and is visible when the housing is seen along the third orientation;
   the first receiving portion partially receives the first busbar when the first busbar is inserted through the first opening;
   the second receiving portion partially receives the second busbar when the second busbar is inserted through the second opening;
   each of the contacts is held by the housing and has a contact portion;
   the contact portion of the first contact is located inside the first receiving portion and is brought into contact with the first busbar when the first busbar is partially received in the first receiving portion; and
   the contact portion of the second contact is located inside the second receiving portion and is brought into contact with the second busbar when the second busbar is partially received in the second receiving portion.

2. The connector as recited in claim 1, wherein each of the first opening and the second opening extends along a plane defined by the predetermined direction and the perpendicular direction.

3. The connector as recited in claim 1, wherein each of the first opening and the second opening extend in a common plane.

4. The connector as recited in claim 1, wherein:
   the housing has a first protection portion and a second protection portion;
   the first protection portion hides the first opening when the housing is seen along a fourth orientation opposite to the third orientation; and
   the second protection portion hides the second opening when the housing is seen along the fourth orientation.

5. The connector as recited in claim 1, wherein:
   each of the contacts has a guide portion;
   the guide portion of the first contact guides the first busbar when the first busbar is inserted through the first opening; and
   the guide portion of the second contact guides the second busbar when the second busbar is inserted through the second opening.

6. The connector as recited in claim 1, wherein:
   the connector comprises a cover; and
   the cover hides, at least in part, each the first opening and the second opening when the connector is seen along the third orientation.

7. The connector as recited in claim 1, wherein:
   each of the contacts has a catch portion and a spring portion;
   in each of the contacts, the contact portion is supported by the spring portion;
   the contact portion and the catch portion of the first contact hold the first busbar therebetween which is partially received in the first receiving portion; and
   the contact portion and the catch portion of the second contact hold the second busbar therebetween which is partially received in the second receiving portion.

8. The connector as recited in claim 7, wherein:
   each of the contacts has an additional spring portion; and
   in each of the contacts, the catch portion is supported by the additional spring portion.

9. The connector as recited in claim 1, wherein:

each of the contacts has a connection portion; and each of the connection portions is connectable to a connection member other than the busbars.

10. The connector as recited in claim 9, wherein:

the housing has an attached portion attachable to an object; and the attached portion extends along a plane defined by the predetermined direction and the perpendicular direction.

11. The connector as recited in claim 10, wherein:

the contact portions of the two contacts are arranged in the predetermined direction; and each of the contact portions is located between the connection portions of the two contacts in the perpendicular direction.

12. The connector as recited in claim 9, wherein:

the housing has an attached portion attachable to an object; and the attached portion extends along a plane perpendicular to the perpendicular direction.

13. The connector as recited in claim 12, wherein:

the contact portions of the two contacts are arranged in the predetermined direction; and each of the contact portions is located between the connection portions of the two contacts in a second perpendicular direction perpendicular to both the predetermined direction and the perpendicular direction.

14. The connector as recited in claim 9, wherein:

each of the contacts has an additional connection portion; and each of the additional connection portions is connectable to an additional connection member other than the busbars and the connection members.

* * * * *